(12) United States Patent
Lai

(10) Patent No.: US 11,982,528 B2
(45) Date of Patent: May 14, 2024

(54) METHOD AND AUXILIARY TARGET FOR ALIGNING CALIBRATION DEVICE TO VEHICLE

(71) Applicant: AUTEL INTELLIGENT TECHNOLOGY CORP., LTD., Guangdong (CN)

(72) Inventor: Biwang Lai, Guangdong (CN)

(73) Assignee: AUTEL INTELLIGENT TECHNOLOGY CORP., LTD., Guangdong (CN)

(*) Notice: Subject to any disclaimer, the term of this patent is extended or adjusted under 35 U.S.C. 154(b) by 199 days.

(21) Appl. No.: 17/479,350

(22) Filed: Sep. 20, 2021

(65) Prior Publication Data
US 2022/0003550 A1 Jan. 6, 2022

Related U.S. Application Data

(63) Continuation of application No. PCT/CN2020/080417, filed on Mar. 20, 2020.

(30) Foreign Application Priority Data

Mar. 20, 2019 (CN) .......................... 201910214541.7
Apr. 30, 2019 (CN) .......................... 201910359763.8

(51) Int. Cl.
  *G01C 15/00* (2006.01)
  *B60S 5/00* (2006.01)

(52) U.S. Cl.
  CPC ............. *G01C 15/004* (2013.01); *B60S 5/00* (2013.01)

(58) Field of Classification Search
  CPC ..... G01C 15/004; B60S 5/00; G01B 2210/12; G01B 11/2755; G01S 17/931;
  (Continued)

(56) References Cited

U.S. PATENT DOCUMENTS 4,630,379 A * 12/1986 Wickmann ........... G01B 11/245
 33/600
4,761,749 A 8/1988 Titsworth et al.
(Continued)

FOREIGN PATENT DOCUMENTS

| CN | 103162974 A | 6/2013 |
| CN | 203163998 U | 8/2013 |

(Continued)

OTHER PUBLICATIONS

International search report dated Jun. 28, 2020; PCT/CN2020/080417.

(Continued)

*Primary Examiner* — John Fitzgerald
*Assistant Examiner* — Tania Courson

(57) ABSTRACT

The disclosure provides a method and auxiliary target for aligning a calibration device to a vehicle. The calibration device includes a calibration bracket and a calibration laser emitter. The calibration bracket includes a crossbar. The method includes: placing a vehicle on a horizontal plane; setting a calibration center point; turning on the calibration laser emitter, so that the calibration laser emitter emits two fan-shaped beams, the two fan-shaped beams forming, on the horizontal plane, a first laser line and a second laser line that intersect and are perpendicular to each other; and adjusting a position of the crossbar, so that a point of intersection of the first laser line and the second laser line coincides with the calibration center point and the first laser line coincides with the line of intersection of the central axial plane of the vehicle and the horizontal plane.

11 Claims, 22 Drawing Sheets

(58) Field of Classification Search
CPC .......... G01S 7/4026; G01S 2013/9323; G01S 2013/93271
See application file for complete search history.

(56) References Cited

U.S. PATENT DOCUMENTS

| | | | |
|---|---|---|---|
| 5,877,680 A | 3/1999 | Okuchi et al. | |
| 6,915,228 B2 | 7/2005 | Uffenkamp et al. | |
| 7,093,369 B2 | 8/2006 | Warkostch | |
| 7,424,387 B1* | 9/2008 | Gill | G01B 11/272 33/288 |
| 10,284,777 B2* | 5/2019 | Rogers | H04N 23/698 |
| 10,323,936 B2* | 6/2019 | Leikert | G01B 11/2755 |
| 10,634,488 B2* | 4/2020 | Stieff | G01B 11/2755 |
| 10,794,996 B2* | 10/2020 | Qiu | G01S 7/4056 |
| 10,821,607 B2* | 11/2020 | Chen | B66F 9/24 |
| 10,921,426 B2* | 2/2021 | Tang | G01S 7/40 |
| 10,996,053 B2* | 5/2021 | Stieff | G01B 11/272 |
| 11,002,574 B2* | 5/2021 | Qiu | G01D 18/00 |
| 11,119,189 B2* | 9/2021 | Lai | G01M 17/007 |
| 11,287,251 B2* | 3/2022 | Stieff | G01M 17/06 |
| 11,390,289 B2* | 7/2022 | Corghi | G01S 7/40 |
| 11,397,080 B2* | 7/2022 | Leikert | G01B 11/2755 |
| 11,624,608 B2* | 4/2023 | Lawrence | G01S 7/4086 701/33.1 |
| 2005/0206098 A1 | 9/2005 | Warkostch | |
| 2010/0238291 A1 | 9/2010 | Pavlov et al. | |
| 2021/0381638 A1* | 12/2021 | Lai | F16M 11/08 |
| 2022/0228860 A1* | 7/2022 | Ohmori | G01S 7/403 |
| 2023/0013762 A1* | 1/2023 | Liu | F16M 11/24 |

FOREIGN PATENT DOCUMENTS

| | | |
|---|---|---|
| CN | 203236156 U | 10/2013 |
| CN | 103868475 A | 6/2014 |
| CN | 103909865 A | 7/2014 |
| CN | 203858117 U | 10/2014 |
| CN | 104406576 A | 3/2015 |
| CN | 106080031 A | 11/2016 |
| CN | 107856649 A | 3/2018 |
| CN | 207274280 U | 4/2018 |
| CN | 108120966 A | 6/2018 |
| CN | 108139193 A | 6/2018 |
| CN | 108267163 A | 7/2018 |
| CN | 209524919 U | 10/2019 |
| DE | 102017214014 A1 | 2/2019 |
| EP | 1532420 B1 | 5/2005 |
| TW | I555971 B | 11/2016 |

OTHER PUBLICATIONS

Evaluation report of utility model of patent application No. 2019203617232.
Extended European Search Report dated Apr. 14, 2022; Appln. No. 20773391.6.

* cited by examiner

Set, on the horizontal plane, a first calibration point corresponding to a center of the head of the vehicle and a second calibration point corresponding to a center of a tail of the vehicle, and use a straight line where the first calibration point and the second calibration point are located as the line of intersection of the central axial plane of the vehicle and the horizontal plane ~S421

Set, on the horizontal plane and respectively on both sides of the central axial plane of the vehicle and according to the first calibration point and the second calibration point, a third calibration point and a fourth calibration point equidistant from the central axial plane of the vehicle, where a line connecting the third calibration point and the fourth calibration point is perpendicular to the central axial plane of the vehicle ~S422

Set, on the horizontal plane, a fifth calibration point at the preset calibration distance from the third calibration point, where a line connecting the third calibration point and the fifth calibration point is parallel to the central axial plane of the vehicle ~S423

Set, on the horizontal plane, a sixth calibration point at the preset calibration distance from the fourth calibration point, where a line connecting the fourth calibration point and the sixth calibration point is parallel to the central axial plane of the vehicle ~S424

Determine a midpoint of a line connecting the fifth calibration point and the sixth calibration point ~S425

Use the midpoint of the line connecting the fifth calibration point and the sixth calibration point as the calibration center point ~S426

FIG. 11

```
┌─────────────────────────────────────────────────────────────┐
│  Set, on the horizontal plane, a first calibration point     │
│  corresponding to a center of the head of the vehicle and a  │
│  second calibration point corresponding to a center of a     │
│  tail of the vehicle, and use a straightline where the first │  S421
│  calibration point and the second calibration point are      │
│  located as the line of intersection of the central axial    │
│  plane of the vehicle and the horizontal plane               │
└─────────────────────────────────────────────────────────────┘
                              ↓
┌─────────────────────────────────────────────────────────────┐
│  Set, on the horizontal plane and on a side of the central   │
│  axial plane of the vehicle and according to the first       │
│  calibration point and the second calibration point, a third │  S427
│  calibration point equidistant from the central axial plane  │
│  of the vehicle                                              │
└─────────────────────────────────────────────────────────────┘
                              ↓
┌─────────────────────────────────────────────────────────────┐
│  Set, on the horizontal plane, a fifth calibration point at  │
│  the preset calibration distance from the third calibration  │
│  point, where a line connecting the third calibration point  │  S423
│  and the fifth calibration point is parallel to the central  │
│  axial plane of the vehicle                                  │
└─────────────────────────────────────────────────────────────┘
                              ↓
┌─────────────────────────────────────────────────────────────┐
│  Determine and set the calibration center point according to │
│  the first calibration point and the fifth calibration point │  S429
└─────────────────────────────────────────────────────────────┘
```

FIG. 13

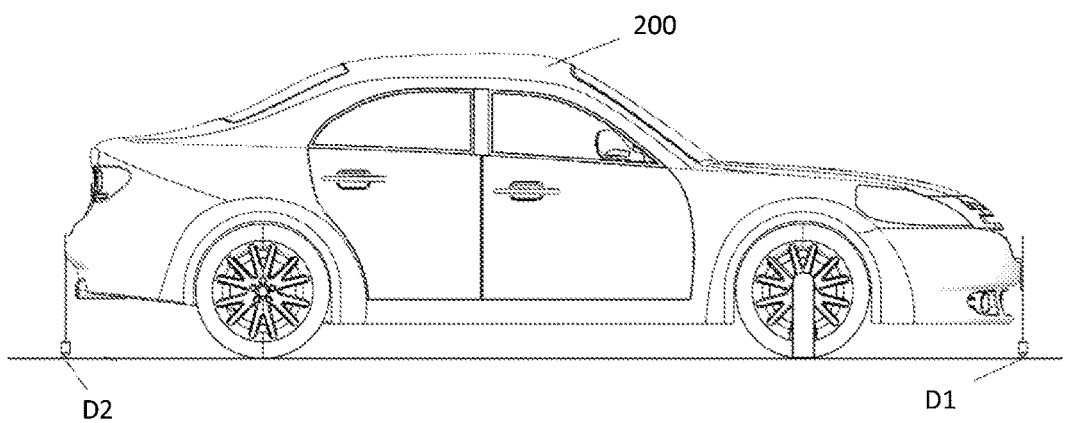

FIG. 14a

METHOD AND AUXILIARY TARGET FOR ALIGNING CALIBRATION DEVICE TO VEHICLE

CROSS-REFERENCE TO RELATED APPLICATIONS

This application is a continuation application of International Application No. PCT/CN2020/080417, filed on Mar. 20, 2020, which claims priority of Chinese Patent Application No. 201910214541.7, filed on Mar. 20, 2019, and claims priority to Chinese Patent Application No. 201910359763.8, filed on Apr. 30, 2019 which are incorporated herein by reference in its entirety.

TECHNICAL FIELD

The present application relates to the technical field of vehicle maintenance and device calibration, and in particular, to a method and auxiliary target for aligning a calibration device to a vehicle.

BACKGROUND

In the field of vehicle maintenance, before calibration of advanced driver assistant systems (ADAS) on a vehicle, four-wheel alignment, and the like by using a calibration device, it is first necessary to set right the calibration device to align the calibration device to the vehicle. The calibration device is maintained to be perpendicular to central axis of the vehicle. If the calibration device has a relatively large angle deviation from the central axis of the vehicle, the calibrated function would have a relatively large deviation or would be inaccurate. The functions calibrated will cause a safety hazard to the vehicle.

Conventional methods for aligning a calibration device to a vehicle mainly rely on drawing of lines on the ground, and are relatively complex.

SUMMARY OF THE DISCLOSURE

Embodiments of the disclosure are intended to provide a method and auxiliary target for aligning a calibration device to a vehicle. The method and the auxiliary target can easily and quickly achieve alignment of the calibration device to the vehicle.

The embodiments of the disclosure adopt the following technical solution to resolve the technical problem.

A method for aligning a calibration device to a vehicle is provided. The calibration device includes a calibration bracket and a calibration laser emitter, and the calibration bracket includes a crossbar.

The method includes:

placing a vehicle on a horizontal plane;

setting a calibration center point on the horizontal plane, so that the calibration center point is located on a line of intersection of a central axial plane of the vehicle and the horizontal plane and the calibration center point is at a preset calibration distance from a plane extending through a head of the vehicle and perpendicular to the horizontal plane, or the calibration center point is at the preset calibration distance from a plane extending through centers of two front wheels of the vehicle and perpendicular to the horizontal plane;

turning on the calibration laser emitter, so that the calibration laser emitter emits two fan-shaped beams, the two fan-shaped beams forming, on the horizontal plane, a first laser line and a second laser line that intersect and are perpendicular to each other, and the crossbar being parallel to the fan-shaped beam where the second laser line is located; and adjusting a position of the crossbar, so that a point of intersection of the first laser line and the second laser line coincides with the calibration center point and the first laser line coincides with the line of intersection of the central axial plane of the vehicle and the horizontal plane.

Optionally, the setting a calibration center point on the horizontal plane includes:

setting, on the horizontal plane, a first calibration point corresponding to a center of the head of the vehicle and a second calibration point corresponding to a center of a tail of the vehicle, and using a straight line where the first calibration point and the second calibration point are located as the line of intersection of the central axial plane of the vehicle and the horizontal plane; and setting the calibration center point on the straight line where the first calibration point and the second calibration point are located and at a position at the preset calibration distance from the plane extending through the head of the vehicle and perpendicular to the horizontal plane.

Optionally, the setting, on the horizontal plane, a first calibration point corresponding to a center of the head of the vehicle and a second calibration point corresponding to a center of a tail of the vehicle further includes:

hanging plumb bobs respectively at the center of the head of the vehicle and the center of the tail of the vehicle, and setting the first calibration point and the second calibration point respectively at points of intersection of the plumb bobs and the horizontal plane.

Optionally, the setting the calibration center point on the straight line where the first calibration point and the second calibration point are located and at a position at the preset calibration distance from the plane extending through the head of the vehicle and perpendicular to the horizontal plane includes:

turning on a first calibration laser emitter, so that the first calibration laser emitter forms a first calibration laser line on the horizontal plane;

moving the first calibration laser emitter, so that the first calibration laser line extends through both the first calibration point and the second calibration point; and setting the calibration center point on the first calibration laser line and at a position that is on one end of the first calibration point away from the vehicle and that is at the preset calibration distance from the first calibration point.

Optionally, the first calibration laser emitter and the calibration laser emitter are the same cross laser emitter. The cross laser emitter is removably mounted to the calibration bracket.

When the cross laser emitter is used as the first calibration laser emitter, the cross laser emitter uses a single-line mode; or when the cross laser emitter is used as the calibration laser emitter, the cross laser emitter uses a cross-line mode.

Optionally, the setting a calibration center point on the horizontal plane includes:

setting, on the horizontal plane, a first calibration point corresponding to a center of the head of the vehicle and a second calibration point corresponding to a center of a tail of the vehicle, and using a straight line where the first calibration point and the second calibration point are located as the line of intersection of the central axial plane of the vehicle and the horizontal plane; and setting the calibration center point on the straight line where the first calibration point and the second calibration point are located and at a position at the preset calibration distance from the plane extending through a line connecting the centers of the two front wheels of the vehicle and perpendicular to the horizontal plane.

Optionally, the method further includes:

acquiring, according to a model of the vehicle, the preset calibration distance and a distance from the plane extending through the head of the vehicle and perpendicular to the horizontal plane to the plane extending through the centers of the two front wheels of the vehicle and perpendicular to the horizontal plane; and determining a preset alignment distance according to the preset calibration distance and the distance from the plane extending through the head of the vehicle and perpendicular to the horizontal plane to the plane extending through the centers of the two front wheels of the vehicle and perpendicular to the horizontal plane.

The setting the calibration center point on the straight line where the first calibration point and the second calibration point are located and at a position at the preset calibration distance from the plane extending through the centers of the two front wheels of the vehicle and perpendicular to the horizontal plane further includes:

setting the calibration center point on the straight line where the first calibration point and the second calibration point are located and at a position that is on one end of the first calibration point away from the vehicle and that is at the preset calibration distance from the first calibration point.

Optionally, the setting a calibration center point on the horizontal plane includes:

setting, on the horizontal plane, a first calibration point corresponding to a center of the head of the vehicle and a second calibration point corresponding to a center of a tail of the vehicle, and using a straight line where the first calibration point and the second calibration point are located as the line of intersection of the central axial plane of the vehicle and the horizontal plane;

setting, on the horizontal plane and respectively on both sides of the central axial plane of the vehicle and according to the first calibration point and the second calibration point, a third calibration point and a fourth calibration point equidistant from the central axial plane of the vehicle, where a line connecting the third calibration point and the fourth calibration point is perpendicular to the central axial plane of the vehicle;

setting, on the horizontal plane, a fifth calibration point at the preset calibration distance from the third calibration point, where a line connecting the third calibration point and the fifth calibration point is parallel to the central axial plane of the vehicle;

setting, on the horizontal plane, a sixth calibration point at the preset calibration distance from the fourth calibration point, where a line connecting the fourth calibration point and the sixth calibration point is parallel to the central axial plane of the vehicle;

determining a midpoint of a line connecting the fifth calibration point and the sixth calibration point; and using the midpoint of the line connecting the fifth calibration point and the sixth calibration point as the calibration center point.

Optionally, the setting, on the horizontal plane and respectively on both sides of the central axial plane of the vehicle and according to the first calibration point and the second calibration point, a third calibration point and a fourth calibration point equidistant from the central axial plane of the vehicle further includes:

placing two auxiliary targets respectively on the front wheels of the vehicle, each of the auxiliary targets including a vertical portion and a support portion, the vertical portion being perpendicularly connected to the support portion and abutting against the front wheel of the vehicle, a central axis of the vertical portion extending through a center point of the front wheel of the vehicle, and the support portion being placed on the horizontal plane;

turning on a second calibration laser emitter, so that the second calibration laser emitter forms a calibration laser point, a second calibration laser line and a third calibration laser line on the horizontal plane, the second calibration laser line and the third calibration laser line being perpendicular to each other and intersecting at the calibration laser point;

moving the second calibration laser emitter, so that the calibration laser point coincides with the first calibration point and the second calibration laser line extends through both the first calibration point and the second calibration point;

setting, on the third calibration laser line and respectively on both sides of the first calibration point, a first reference point and a second reference point equidistant from the first calibration point;

moving the second calibration laser emitter, so that the calibration laser point coincides with the first reference point and the third calibration laser line extends through the first calibration point, and setting the third calibration point at a point of intersection of the second calibration laser line and the support portion of one of the auxiliary targets; and moving the second calibration laser emitter, so that the calibration laser point coincides with the second reference point and the third calibration laser line extends through the first calibration point, and setting the fourth calibration point at a point of intersection of the second calibration laser line and the support portion of the other of the auxiliary targets.

Optionally, the support portion has a through groove,

The setting, on the horizontal plane and respectively on both sides of the central axial plane of the vehicle and according to the first calibration point and the second calibration point, a third calibration point and a fourth calibration point equidistant from the central axial plane of the vehicle further includes:

setting the third calibration point and the fourth calibration point in the through grooves.

Optionally, the determining a midpoint of a line connecting the fifth calibration point and the sixth calibration point further includes:

moving the second calibration laser emitter, so that the second calibration laser line extends through both the first calibration point and the second calibration point and the third calibration laser line extends through both the fifth calibration point and the sixth calibration point; and setting, on the horizontal plane, a point coinciding with the calibration laser point as the midpoint of the line connecting the fifth calibration point and the sixth calibration point.

Optionally, the setting a calibration center point on the horizontal plane includes:

setting, on the horizontal plane, a first calibration point corresponding to a center of the head of the vehicle and a second calibration point corresponding to a center of a tail of the vehicle, and using a straight line where the first calibration point and the second calibration point are located as the line of intersection of the central axial plane of the vehicle and the horizontal plane;

setting, on the horizontal plane and on a side of the central axial plane of the vehicle and according to the first calibration point and the second calibration point, a third calibration point equidistant from the central axial plane of the vehicle;

setting, on the horizontal plane, a fifth calibration point at the preset calibration distance from the third calibration point, where a line connecting the third calibration point and the fifth calibration point is parallel to the central axial plane of the vehicle; and determining and setting the calibration center point according to the first calibration point and the fifth calibration point.

Optionally, the setting, on the horizontal plane and on a side of the central axial plane of the vehicle and according to the first calibration point and the second calibration point, a third calibration point equidistant from the central axial plane of the vehicle, further includes:

placing an auxiliary target on one of the front wheels of the vehicle, the auxiliary target including a vertical portion and a support portion, the vertical portion being perpendicularly connected to the support portion and abutting against the front wheel of the vehicle, a central axis of the vertical portion extending through a center point of the front wheel of the vehicle, and the support portion being placed on the horizontal plane;

turning on a second calibration laser emitter, so that the second calibration laser emitter forms a calibration laser point, a second calibration laser line and a third calibration laser line on the horizontal plane, the second calibration laser line and the third calibration laser line being perpendicular to each other and intersecting at the calibration laser point;

moving the second calibration laser emitter, so that the calibration laser point coincides with the first calibration point and the second calibration laser line extends through both the first calibration point and the second calibration point;

setting a first reference point on the third calibration laser line and on one side of the first calibration point; and moving the second calibration laser emitter, so that the calibration laser point coincides with the first reference point and the third calibration laser line extends through the first calibration point, and setting the third calibration point at a point of intersection of the second calibration laser line and the support portion of the auxiliary target.

Optionally, the determining and setting the calibration center point according to the first calibration point and the fifth calibration point further includes:

setting a seventh calibration point on the second calibration laser line and on one side of the first calibration point away from the second calibration point when the calibration laser point of the second calibration laser emitter coincides with the first calibration point and the second calibration laser line extends through both the first calibration point and the second calibration point;

moving the second calibration laser emitter, so that the second calibration laser line extends through both the first calibration point and the seventh calibration point and the third calibration laser line extends through the fifth calibration point; and setting, on the horizontal plane, a point coinciding with the calibration laser point as the calibration center point.

Optionally, the calibration bracket further includes a vertical rod assembly and an angle adjustment mechanism. The vertical rod assembly is connected to the crossbar by using the angle adjustment mechanism. The crossbar is configured to mount the calibration laser emitter. The angle adjustment mechanism is configured to rotate the crossbar relative to the vertical rod assembly.

The adjusting a position of the crossbar, so that a point of intersection of the first laser line and the second laser line coincides with the calibration center point and the first laser line coincides with the line of intersection of the central axial plane of the vehicle and the horizontal plane includes:

adjusting the point of intersection of the first laser line and the second laser line to coincide with the calibration center point, and adjusting the angle adjustment mechanism, so that the first laser line coincides with the line of intersection of the central axial plane of the vehicle and the horizontal plane.

The embodiments of the disclosure further adopt the following technical solution to resolve the technical problem.

An auxiliary target, applicable to the foregoing method for aligning a calibration device to a vehicle, includes a vertical portion and a support portion. The vertical portion is perpendicularly connected to the support portion. The support portion includes a through groove.

When the auxiliary target is disposed on a front wheel of the vehicle, the vertical portion abuts against the front wheel of the vehicle, a central axis of the vertical portion extends through a center point of the front wheel of the vehicle, and the support portion is placed on a horizontal plane where the vehicle is placed.

Optionally, the vertical portion has a marker on the central axis thereof, the marker being configured to be aligned to the center point of the wheel.

Optionally, the marker is one of:

a marking line or a marking point located on the central axis of the vertical portion;

an elongated marking structure disposed on the central axis of the vertical portion; and a through groove provided on the central axis of the vertical portion.

Compared with the prior art, the method for aligning a calibration device to vehicle in the embodiments has the following advantages. The calibration center point at the preset calibration distance from the plane extending through the head of the vehicle and perpendicular to the horizontal plane or at the preset calibration distance from the plane extending through the centers of the two front wheels of the vehicle and perpendicular to the horizontal plane is set on the horizontal plane on which the vehicle is placed. The calibration laser emitter disposed on the calibration bracket is turned on, so that the calibration laser emitter emits two fan-shaped beams. The two fan-shaped beams form, on the horizontal plane, the first laser line and the second laser line that intersect and are perpendicular to each other. The crossbar of the calibration crossbar is adjusted. In this way, the point of intersection of the first laser line and the second laser line coincides with the calibration center point and the first laser line coincides with the line of intersection of the central axial plane of the vehicle and the horizontal plane. Therefore, alignment of the calibration device to the vehicle is achieved. In this way, the alignment of the calibration device to the vehicle can be easily and quickly achieved. The method is applicable to various vehicle models.

BRIEF DESCRIPTION OF THE DRAWINGS

One or more embodiments are exemplarily described with reference to the corresponding figures in the accompanying drawings. The descriptions are not to be construed as limiting the embodiments. Elements in the accompanying drawings that have same reference numerals are represented as similar elements. Unless otherwise particularly stated, the figures in the accompanying drawings are not drawn to scale.

FIG. 6b is a partial enlarged view of a part B in FIG. 6a.

FIG. 11 is another schematic flowchart of S420 in the method shown in FIG. 8.

FIG. 13 is still another schematic flowchart of S420 in the method shown in FIG. 8

FIG. 14a to FIG. 14e are schematic diagrams of a process of determining a position of a calibration center point in the method shown in FIG. 13.

DETAILED DESCRIPTION OF THE DISCLOSURE

For ease of understanding the disclosure, the disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside", "vertical" and "horizontal" are based on orientation or position relationships shown in the accompanying drawings. The terms are merely for ease of description of the disclosure and for brevity of description, rather than indicating or implying that the mentioned apparatus or element needs to have a particular orientation or needs to be constructed and operated in a particular orientation. Therefore, the terms should not be understood as a limitation on the disclosure. In addition, the terms "first" and "second" are merely used for description and should not be understood as indicating or implying relative importance.

Unless otherwise defined, meanings of all of the technical and scientific terms used in the specification are the same as those usually understood by those skilled in the art of the disclosure. The terms used in the specification of the disclosure are merely intended to describe objectives of the specific embodiment, and are not intended to limit the disclosure. The term "and/or" used in this specification includes any or all combinations of one or more related listed items.

In addition, technical features involved in different embodiments of the disclosure described below may be combined together if there is no conflict.

Embodiment I

Figure 1:
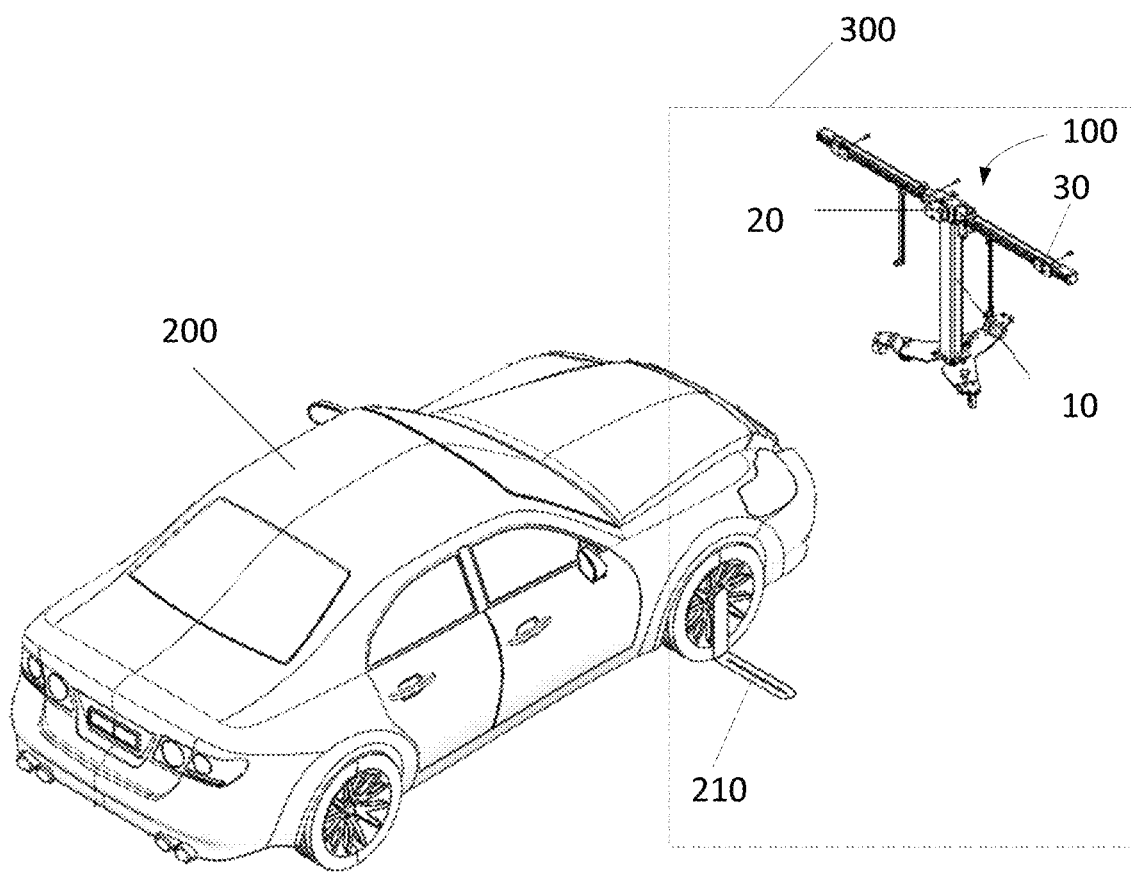
FIG. 1 is a schematic diagram of an application scenario of a method for aligning a calibration device to a vehicle according to an embodiment of the disclosure.

FIG. 1 is a schematic diagram of an application scenario of a method for aligning a calibration device 100 to a vehicle 200 according to an embodiment of the disclosure. As shown in FIG. 1, the application scenario includes a calibration system 300 and a vehicle 200. The calibration system 300 includes a calibration device 100. The calibration device 100 is configured to calibrate the vehicle 200 after being aligned to the vehicle 200.

The vehicle 200 may be any type and model of vehicles, such as automobiles, trams, trains, trucks or the like.

The calibration device 100 includes a calibration bracket 10 and a calibration laser emitter 20. The calibration laser emitter 20 is disposed on the calibration bracket 10.

Figure 2:
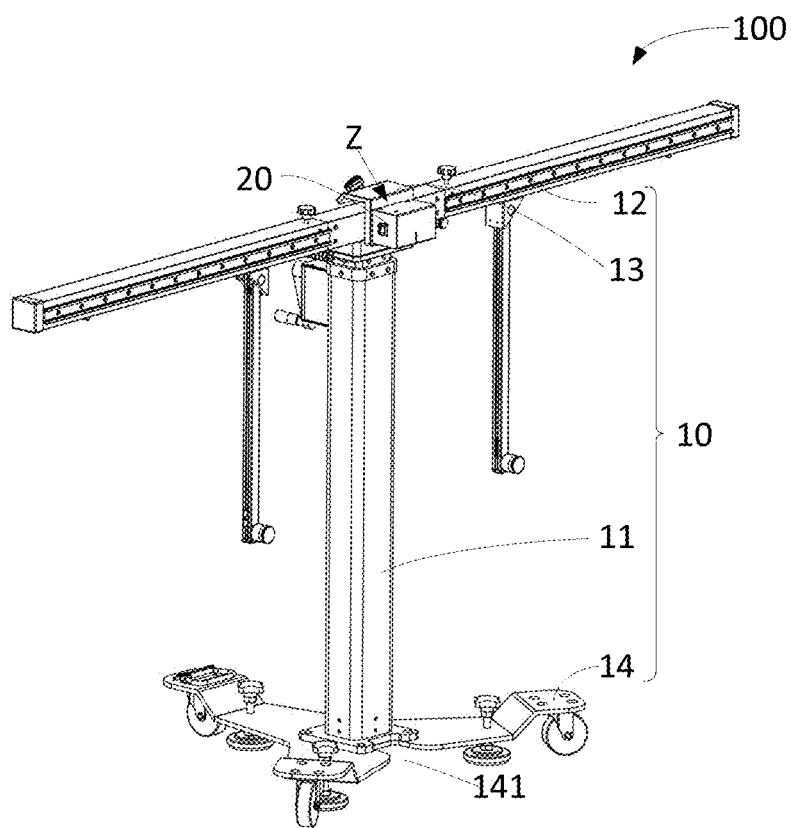
FIG. 2 is a schematic structural diagram of a calibration bracket of a calibration device shown in FIG. 1.

Specifically, referring to FIG. 2, the calibration bracket 10 may include a vertical rod assembly 11, a crossbar 12 and an angle adjustment mechanism 13. The vertical rod assembly 11 and the crossbar 12 are connected by using the angle adjustment mechanism 13. The crossbar 12 may be rotated relative to the vertical rod assembly 11 by adjusting the angle adjustment mechanism 13.

Figure 3:
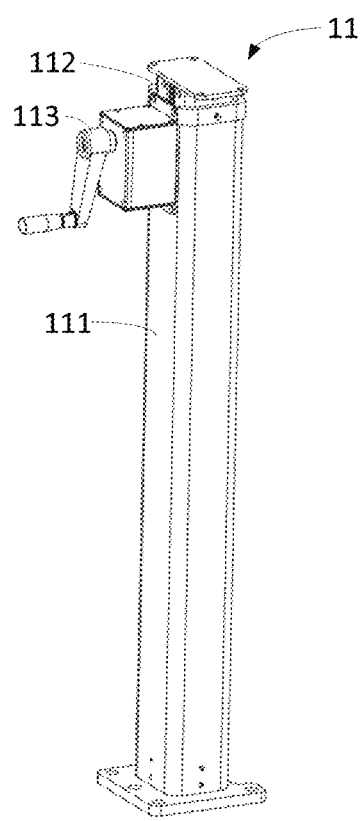
FIG. 3 is a schematic structural diagram of a vertical rod assembly of the calibration bracket of the calibration device shown in FIG. 2.

Referring to FIG. 3, the vertical rod assembly 11 may include a fixed vertical rod 111, a movable vertical rod 112 and a driving mechanism 113. The movable vertical rod 112 is inserted in the fixed vertical rod 111 and is movable relative to the fixed vertical rod 111 along a length direction of the fixed vertical rod 111. The driving mechanism 113 is mounted to the fixed vertical rod 111 for driving the movable vertical rod 112 to move along the length direction of the fixed vertical rod 111 relative to the fixed vertical rod 111. By inserting the movable vertical rod 112 in the fixed vertical rod 111, a height of the vertical rod assembly 11 can be adjusted as required.

It may be understood that the fixed vertical rod may also be used as an inner rod and the movable vertical rod as an outer rod as required. The driving mechanism 113 is mounted to the fixed vertical rod 111 and configured to drive the movable vertical rod 112 to move in the length direction of the fixed vertical rod 111 relative to the fixed vertical rod 111. The vertical rod may also be a non-sleeve structure, and may be an ordinary vertical rod or a vertical rod constructed in any form.

It may be understood that, in some other embodiments, the driving mechanism 113 may be omitted. The fixed vertical rod 111 and the movable vertical rod 112 may be locked and released by using other mechanisms.

The crossbar 12 is mounted to the vertical rod assembly 11 by using the angle adjustment mechanism 13. The crossbar 12 may be configured to mount the calibration laser emitter 20 to align the calibration device 100 to the vehicle 200. The crossbar 12 may be further configured to hang a calibration element such as a multi-line laser emitter, a calibration target, a radar reflection or absorption apparatus, or the like for calibrating the vehicle 200.

Figure 4A:
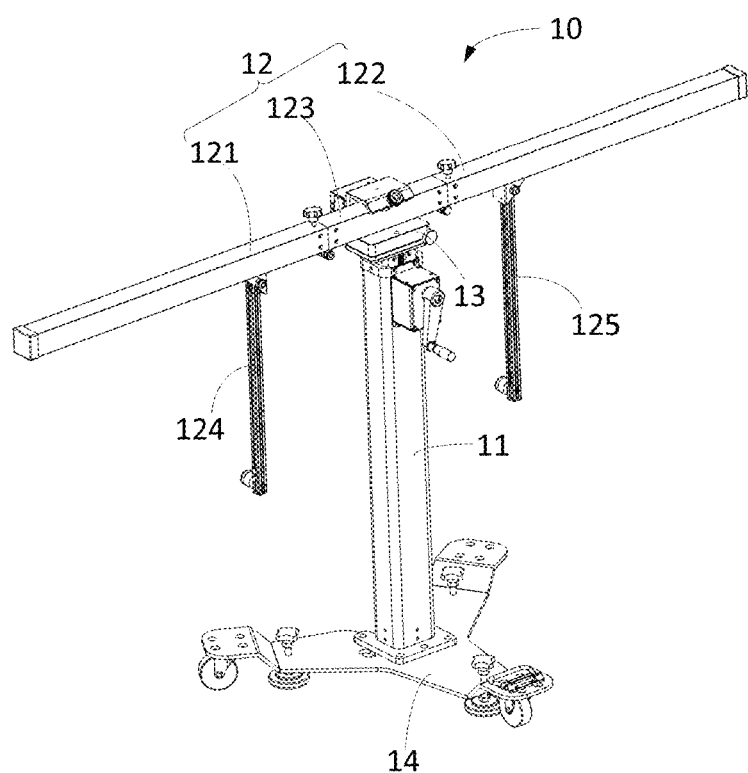
FIG. 4a is a schematic structural diagram of the calibration bracket shown in FIG. 1.
Figure 4B:
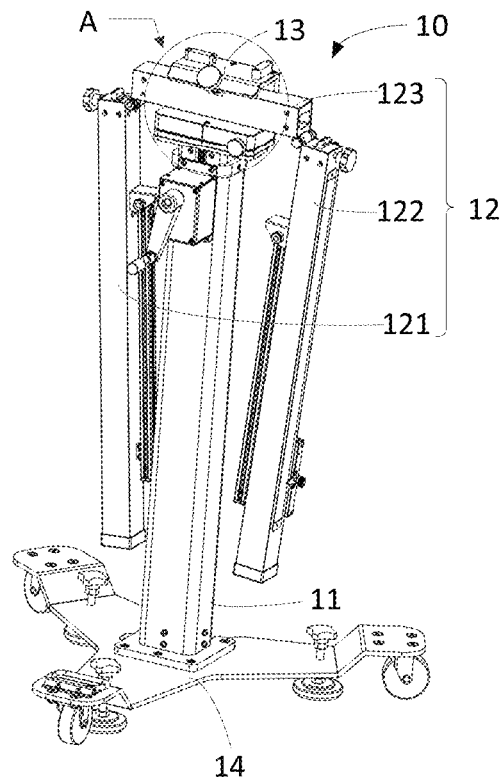
FIG. 4b is a schematic structural diagram of the calibration bracket shown in FIG. 4a, a crossbar of the calibration bracket being folded.

Specifically, referring FIG. 4a and FIG. 4b together, the crossbar 12 may include a first crossbar portion 121, a second crossbar portion 122 and a connecting portion 123. The connecting portion 123 is mounted on a top surface of the movable vertical rod 112 of the vertical rod assembly 11 by using the angle adjustment mechanism 13. One end of the connecting portion 123 is hinged to the first crossbar portion 121. An other end of the connecting portion 123 is hinged to the second crossbar portion 122. The first beam portion 121 and the second crossbar portion 122 can respectively rotate toward each other relative to the connecting portion 123, to fold the crossbar 12. The first crossbar portion 121 and the second crossbar portion 122 can also respectively rotate away from each other relative to the connecting portion 123, to unfold the crossbar 12.

Those skilled in the art may understand that the manner of folding the crossbar 12 is not limited to the foregoing manners. For example, the crossbar may be folded into two sections. In this case, the connecting portion 123 does not exist. The crossbar may also be folded into four or more sections. However, three sections are preferred, because in this case a middle section of the beam has no fracture. In this way, the beam can be stably fixed onto the vertical rod assembly by using only one fastening component at the middle section. The crossbar may also be an ordinary unfolded cross-bar.

Optionally, referring to FIG. 4a again, the crossbar 12 may further include a first supporting rod 124 and a second supporting rod 125. One end of the first supporting rod 124 can be pivotally connected to the first beam portion 121 through a hinge mechanism, and the like. The first supporting rod 124 can rotate relative to the first crossbar portion 124 to be unfolded to be perpendicular to the first crossbar portion 121 or to be engaged with and parallel to the first crossbar portion 121. An other end of the first supporting rod 124 may be in contact with and perpendicular to the ground. Similarly, one end of the second supporting rod 125 can be pivotally connected to the second crossbar portion 122 through a hinge mechanism, and the like. The second supporting rod 125 can rotate relative to the second crossbar portion 122 to be unfolded to be perpendicular to the second crossbar portion 122 or to be engaged with and parallel to the second crossbar portion 122. An other end of the second supporting rod 125 may be in contact with and perpendicular to the ground. The first supporting rod 124 and the second supporting rod 125 are disposed to support the crossbar 12, especially when a target has a relatively large area and a relatively large weight.

Figure 5:
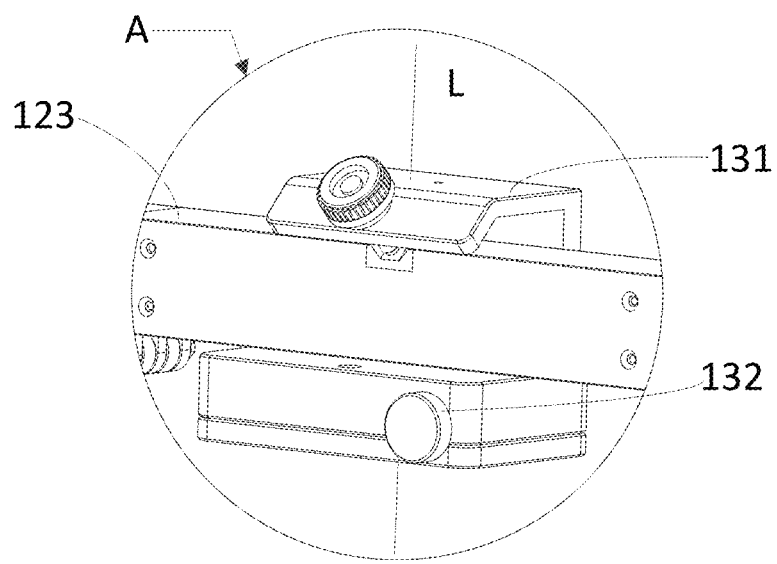
FIG. 5 is a partial enlarged view of a part A in FIG. 4b.

The angle adjustment mechanism 13 is configured to rotate the crossbar 12 relative to the vertical rod assembly 11. Referring to FIG. 5, the angle adjustment mechanism 13 may include a mounting base 131 and an adjustment mechanism 132.

The crossbar 12 may be inserted in the mounting base 131 by using the connecting portion 123. The adjustment mechanism 132 is connected to the vertical rod assembly 11. The mounting base 131 is disposed on the adjustment mechanism 132. The adjustment mechanism 132 is configured to adjust an angle of the crossbar 12 in a horizontal direction (that is, the yaw angle). Therefore, the mounting base 131 can rotate about an adjustment rotation axis L relative to the vertical rod assembly 11 by means of the adjustment of the adjustment mechanism 132, to adjust a horizontal angle of the mounting base 131 and the crossbar 12.

Preferably, the adjustment mechanism 132 is disposed above the mounting base 131 to facilitate removal and mounting of the beam from above while implementing adjustment of the horizontal angle. The adjustment rotation axis L is disposed in parallel to the fixed vertical rod 111 and the movable vertical rod 112. That is to say, when the calibration bracket 10 is placed on a horizontal plane, the adjustment rotation axis L is vertically disposed. A notch may be provided on the mounting base 131 to facilitate placement of the crossbar 12 into the mounting base 131 or removal of the crossbar 12 from the mounting base 131. In this embodiment of the disclosure, as shown in FIG. 2, a laser emitter may be mounted in a plane Z opposite to the notch of the mounting base for projecting two laser lines perpendicular to and intersecting with each other. A point of intersection of the two laser lines corresponds to a representation point of a position of the calibration bracket 10. The representation point is actually a projection of a geometric center point if a calibration plane of a calibration element used for calibration on the ground. For example, when the calibration element is a pattern target placed at a central position in front of the vehicle 200, the representation point is a projection of a geometric center point, of a pattern of the pattern target, in a plane where the pattern of the pattern target is located on the ground. When the calibration element is two pattern targets respectively placed on a left side and a right side in front of the vehicle 200, the representation point is a projection of a midpoint of a line connecting geometric center points, of the two pattern targets, in a plane where the patterns of the pattern targets are located on the ground. When the calibration element is a radar reflector, the representation point is a projection of a geometric center point of a radar reflecting surface on the ground. During product manufacturing, it is necessary to accurately measure and adjust an exiting position of light emitted by a laser emitter. In this way, for a calibration bracket 10 of a specific size, the point of intersection of the two laser lines corresponds to a representation point of a position of the calibration bracket 10. Therefore, during use, the point of intersection of the two laser lines is used as the representation point of the position of the calibration bracket 10. When the point of intersection of the two laser lines is in place, it indicates that the calibration bracket 10 is placed in a proper position.

In addition, one of the two laser lines perpendicular to and intersecting each other is parallel to a projection of the crossbar 12 on the ground and coincides with a projection of a calibration plane of the calibration element on the ground after the calibration element is hung on the crossbar 12. The two laser lines perpendicular to and intersecting each other are actually formed by two fan-shaped laser beams. In fact, since one of the fan-shaped laser beams coincides with the calibration plane of the calibration element, the other of the fan-shaped laser beams is perpendicular to the calibration plane of the calibration element.

The mounting base 131 is fixedly connected to the crossbar 12. Therefore, when the laser emitter is disposed in the plane Z of the mounting base 131, the laser emitter can be maintained at a predetermined positional relationship with the crossbar 12. In this way, a point of intersection of laser lines projected by the laser emitter can represent the projection of the geometric center point of the calibration surface of the calibration element that is used on the ground. The predetermined positional relationship between the laser emitter and the crossbar 12 is not affected even when the angle of the crossbar 12 is changed under driving of the adjustment mechanism 132.

Optionally, still referring to FIG. 2, the calibration bracket 10 may further include a pedestal 14. The vertical rod assembly 111 is fixedly connected to the pedestal 14. The base body 14 has a triangular claw shape and includes three claws respectively extending in three different directions. When the calibration laser emitter 20 is disposed on the calibration bracket 10, the calibration laser emitter 20 may be disposed on a side away from one of the claws. Therefore, a laser emitted by the calibration laser emitter 20 is located between other two of the claws.

Certainly, in some other embodiments, a shape of the pedestal 14 may vary according to actual requirements rather than being limited to a triangle claw shape. For example, the pedestal 14 may be a rectangle, a circle or the like. Components such as rollers, height adjustment members and the like may be added to the pedestal 14 according to actual requirements. In this embodiment of the disclosure, the shape and the structure of the pedestal 14 only need to satisfy that the projection of the point of intersection of the two laser lines projected by the calibration laser emitter 20 is located on the ground.

It may be understood that the calibration bracket 10 may also have other structural forms. The structural form may be selected and configured according to actual situations.

Figure 6A:
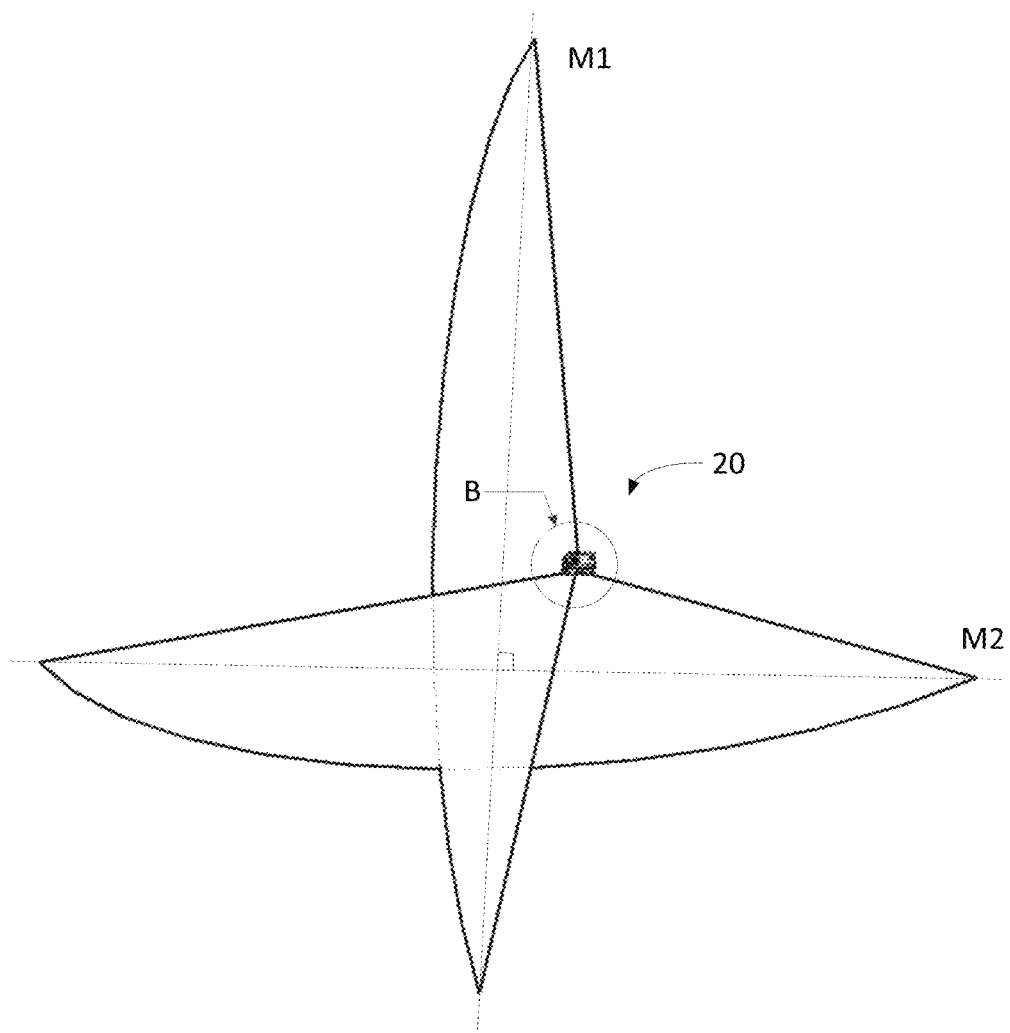
FIG. 6a is a schematic structural diagram of a calibration laser emitter shown in FIG. 1.
Figure 6B:
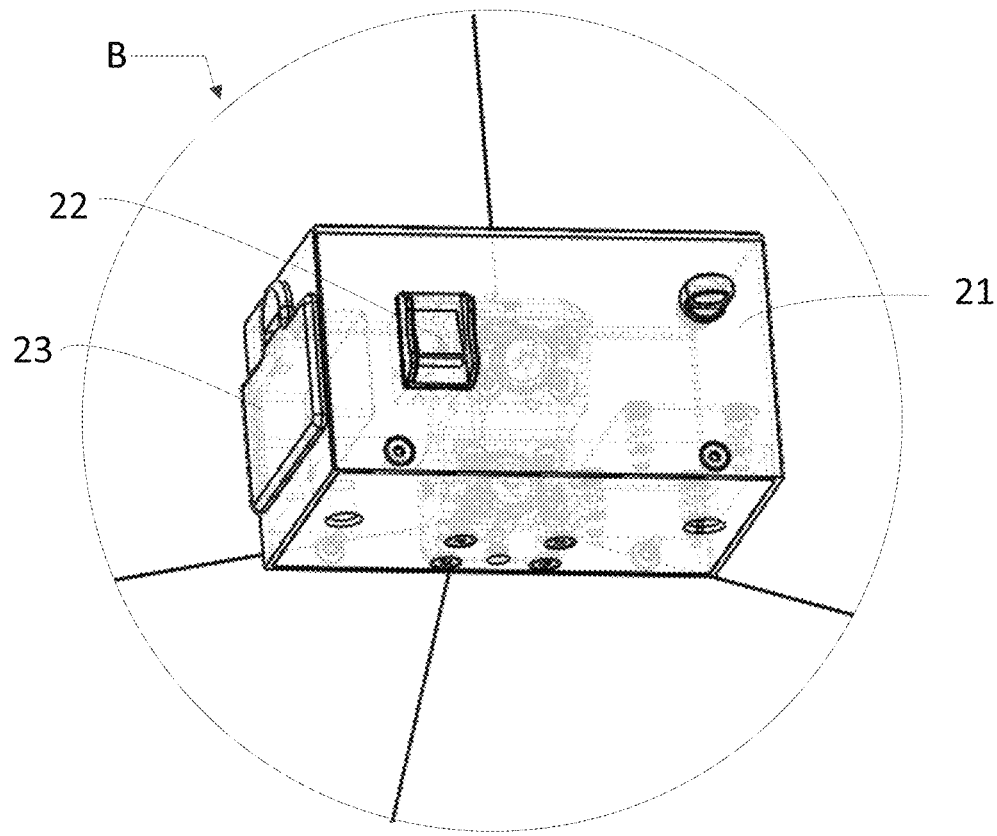
Figure 6C:
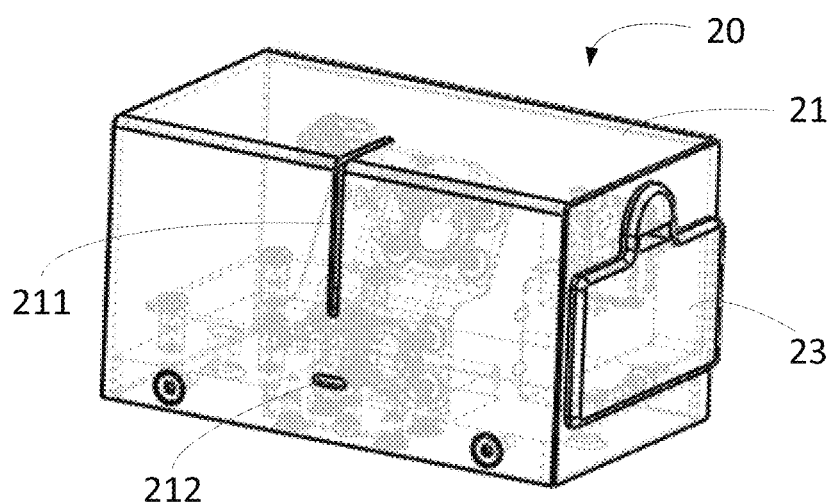
FIG. 6c is a schematic structural diagram of the calibration laser emitter shown in FIG. 6a from another perspective.

Referring to FIG. 6a to FIG. 6c together, the calibration laser emitter 20 is configured to emit two fan-shaped beams. The two fan-shaped beams form, on the horizontal plane, a first laser line M1 and a second laser line M2 that intersect and are perpendicular to each other. The calibration laser emitter 20 may also be a multi-line laser emitter or other laser emitters, as long as the two laser lines that intersect and are perpendicular to each other can be formed. The calibration laser emitter 20 may be disposed on the angle adjustment mechanism 13. In this way, the vertical rod assembly 11 is located in a plane where one of the fan-shaped beams formed by the calibration laser emitter 20 is located, and a point of intersection of the first laser line M1 and the second laser line M2 formed by the calibration laser emitter 20 is projected onto right front of the vertical rod assembly 11. As shown in FIG. 2, a notch 141 may be provided on the pedestal 14. In this way, the point of intersection of the first laser line M1 and the second laser line M2 is projected on the ground under the notch 141. Certainly, in some other embodiments, the calibration laser emitter 20 may also be placed in other positions. For example, the calibration laser emitter may be directly placed on the crossbar 12 when the mounting base 131 does not exist, as long as the point of intersection of the two laser lines can correspond to the representation point of the position of the calibration bracket 10.

Specifically, the calibration laser emitter 20 may include a housing 21, a switch 22 and a cell box 23. The housing 21 is configured to receive a laser emitting body. The switch 22 is mounted to the housing 21 and is configured to turn on or turn off the calibration laser emitter 20. The cell box 23 is mounted to the housing 21 and is configured to accommodate cells to provide working power for the calibration laser emitter 20.

The housing 21 has a first light exiting hole 211 and a second light exiting hole 212. The first light exiting hole 211 is an L-shaped. One end of the first light exiting hole is provided on one of side walls of the housing 21 and is perpendicular to the second light exiting hole 212. An other end is provided on another adjacent one of the side walls of the housing 21. The first light exiting hole 211 is configured to allow a laser crossbar to be emitted. The second light exiting hole 212 is in a shape of a long hole and is provided on one of the side walls of the housing 21. The second light exiting hole 212 is configured to allow the other laser crossbar to be emitted. By providing the first light exiting hole 211 and the second light exiting hole 212, the calibration laser emitter 20 can emit two fan-shaped beams perpendicular to each other. In this way, the two fan-shaped beams form, on the horizontal plane, the first laser line M1 and the second laser line M2 that intersect and are perpendicular to each other.

The calibration device 100 may further include a first calibration laser emitter (not shown in the figure). The first calibration laser emitter may be single-line laser emitter for forming a first calibration laser line on the horizontal plane. The first calibration laser emitter may also be other laser emitters as long as a laser line can be formed on the horizontal plane.

Optionally, the first calibration laser emitter may be replaced with the calibration laser emitter 20. The calibration laser emitter 20 is a cross laser emitter. The cross laser has a single-line mode and a cross-line mode. In the single-line mode, the cross laser emitter emits one fan-shaped beam to form a laser line on the horizontal plane. In the cross-line mode, the cross laser emitter emits two fan-shaped beams to form, on the horizontal line, two laser lines that intersect and are perpendicular to each other. The calibration laser emitter 20 is removably mounted to the calibration bracket 10. When used as the first calibration laser emitter, the calibration laser emitter 20 is disassembled from the calibration bracket 10, and the single-line mode is used. When used as the calibration laser emitter, the calibration laser emitter 20 is mounted to the calibration bracket 10, and the cross-line mode is used.

The calibration device 100 may further include a second calibration laser emitter (not shown in the figure). The second calibration laser emitter may be a five-line laser emitter for forming a calibration laser point, a second calibration laser line and a third calibration laser line on the horizontal plane. The second calibration laser line and the third calibration laser line are perpendicular to each other and intersect at the calibration laser point. The second calibration laser emitter may also be other laser emitters, as long as the two laser lines that are perpendicular to each other and intersect at the calibration laser point can be formed.

Referring to FIG. 1 again, the calibration device 100 may further include a calibration target 30. The calibration target 30 is disposed on the calibration bracket 10. The calibration target 30 may be a reflector, a pattern plate or the like. The calibration target 30 may be hung on the crossbar 12. There may be two calibration targets 30 respectively hung on the first crossbar portion 121 and the second crossbar portion 122 to calibrate the vehicle 200.

Referring to FIG. 1 again and FIG. 7a to FIG. 7d, the calibration system 300 may further include an auxiliary target 210. The auxiliary target 210 is placed on a wheel of the vehicle 200 and is configured to assist in setting of a calibration point. The auxiliary target 210 may have an "L"-shaped structure. The auxiliary target 210 includes a vertical portion 211 and a support portion 212. The vertical portion 211 is perpendicularly connected to the support portion 212. The support portion 212 is configured to be placed on the ground, and the vertical portion 211 is configured to be attached to the wheel. Optionally, a through groove 213 is provided on the support portion 212. In this way, when the support portion 212 is placed on the ground, the ground is visible through the through groove 213.

In this embodiment, two auxiliary targets 210 are respectively placed on two front wheels of the vehicle 200. When the auxiliary target 210 is placed on the front wheel of the vehicle 200, the vertical portion 211 abuts against the front wheel of the vehicle 200, a central axis of the vertical portion 211 extends through a center of the front wheel of the vehicle 200, and the support portion 212 is placed on the horizontal plane. When the vehicle 200 is placed on the horizontal plane and the front wheels are tangent to the horizontal plane, the front wheels and the horizontal plane form a tangent line. When the auxiliary target 210 is disposed on the front wheel of the vehicle 200, the support portion 212 is placed on the tangent line, and the vertical portion 211 is perpendicular to the tangent line. In this case, the central axis of the vertical portion 211 extends through the center point of the front wheel (that is, a center point of a rim).

Figure 7A:
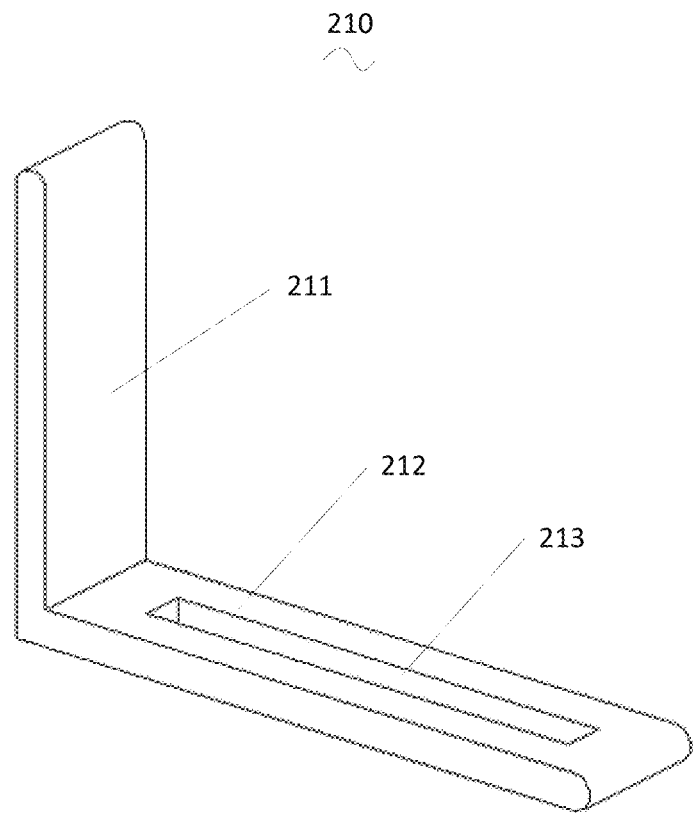
FIG. 7a to FIG. 7d are schematic structural diagrams of an auxiliary target shown in FIG. 1.
Figure 7B:
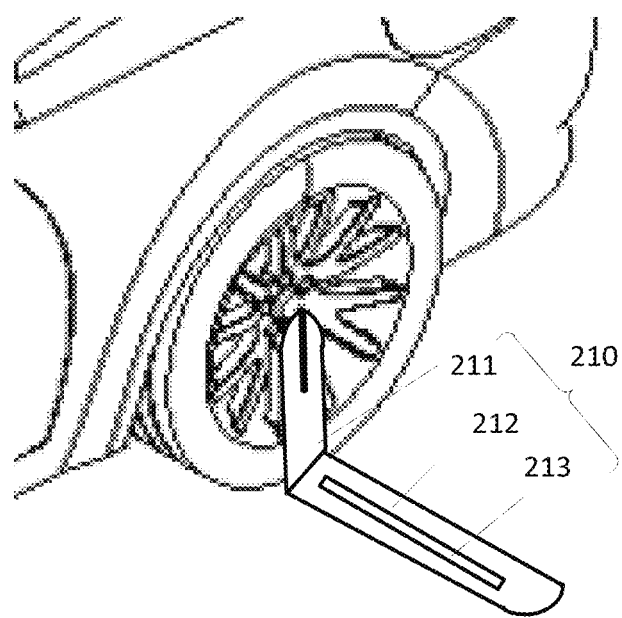
Figure 7C:
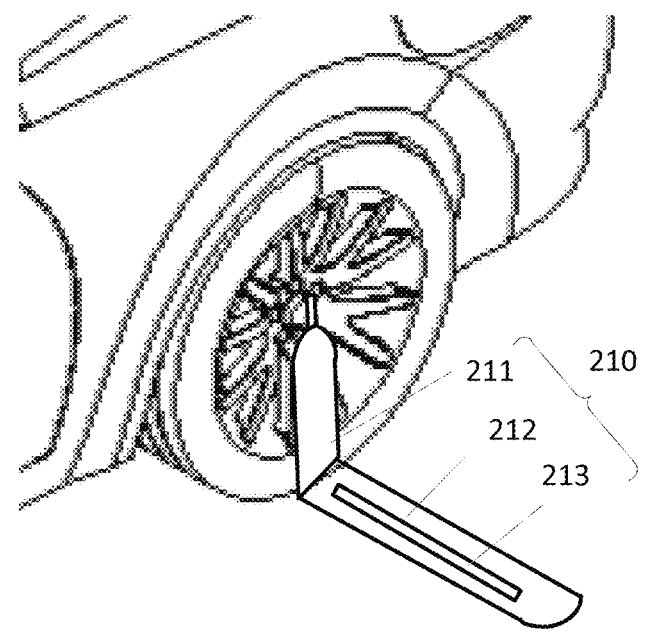
Figure 7D:
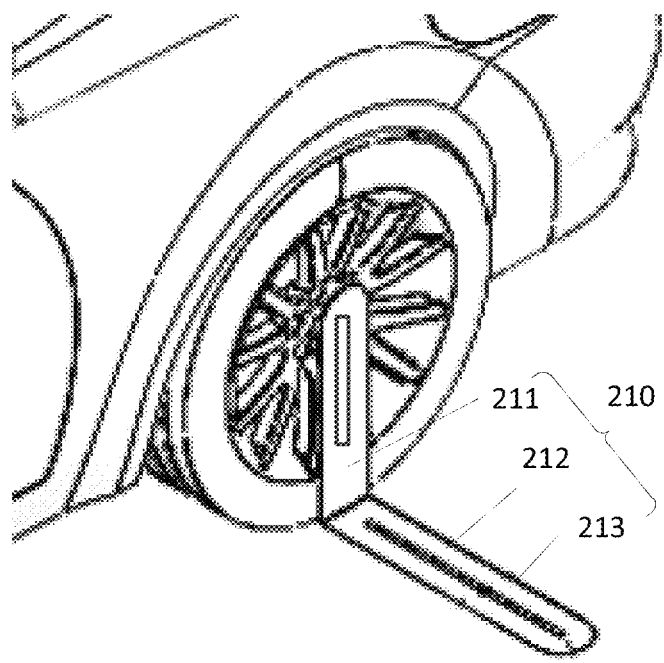

It may be understood that a mark may be set on the central axis of the vertical portion 211, so that the central axis of the vertical portion 211 is more accurately aligned to the center of the wheel. For example, as shown in FIG. 7b, a corresponding marking line, a corresponding marking point and the like may be set on the central axis of the vertical portion 211. If it is determined by visual inspection or measurement that the marking line or the marking point is aligned to the center point of the wheel or is equidistant from left and right markers on the rim that are at the same distance, for example, equidistant from left and right farthest positions on an edge of a rim ring that are at the same distance from a center of the rim, the central axis of the vertical portion 211 is considered to extend through the center point of the front wheel. As shown in FIG. 7c, an elongated marking structure may be further disposed on the central axis of the vertical portion 211 to facilitate alignment to the center point of the front wheel. As shown in FIG. 7d, a through groove may be further provided on the central axis of the vertical portion 211. The wheel rim is visible through the through groove. Preferably, through the through groove, small sections of an upper edge and a lower edge of the rim ring at the center of the rim can be seen. If it is determined that the respective sections of the upper edge and the lower edge are approximately parallel to each other or are bent in directions not obviously opposite, the central axis of the vertical portion 211 is determined to extend through the center point of the front wheel.

In this embodiment, when the auxiliary target 210 is disposed on the front wheel of the vehicle 200, the vertical portion 211 abuts against the front wheel of the vehicle 200, the central axis of the vertical portion 211 extends through the center point of the front wheel of the vehicle 200, and the support portion 212 is placed on the horizontal plane where the vehicle 200 is placed. This assists in alignment of the calibration device to the vehicle 200. In this way, alignment of the calibration device to the vehicle 200 can be easily and quickly achieved. The method is applicable to various vehicle models.

Embodiment II

Figure 8:
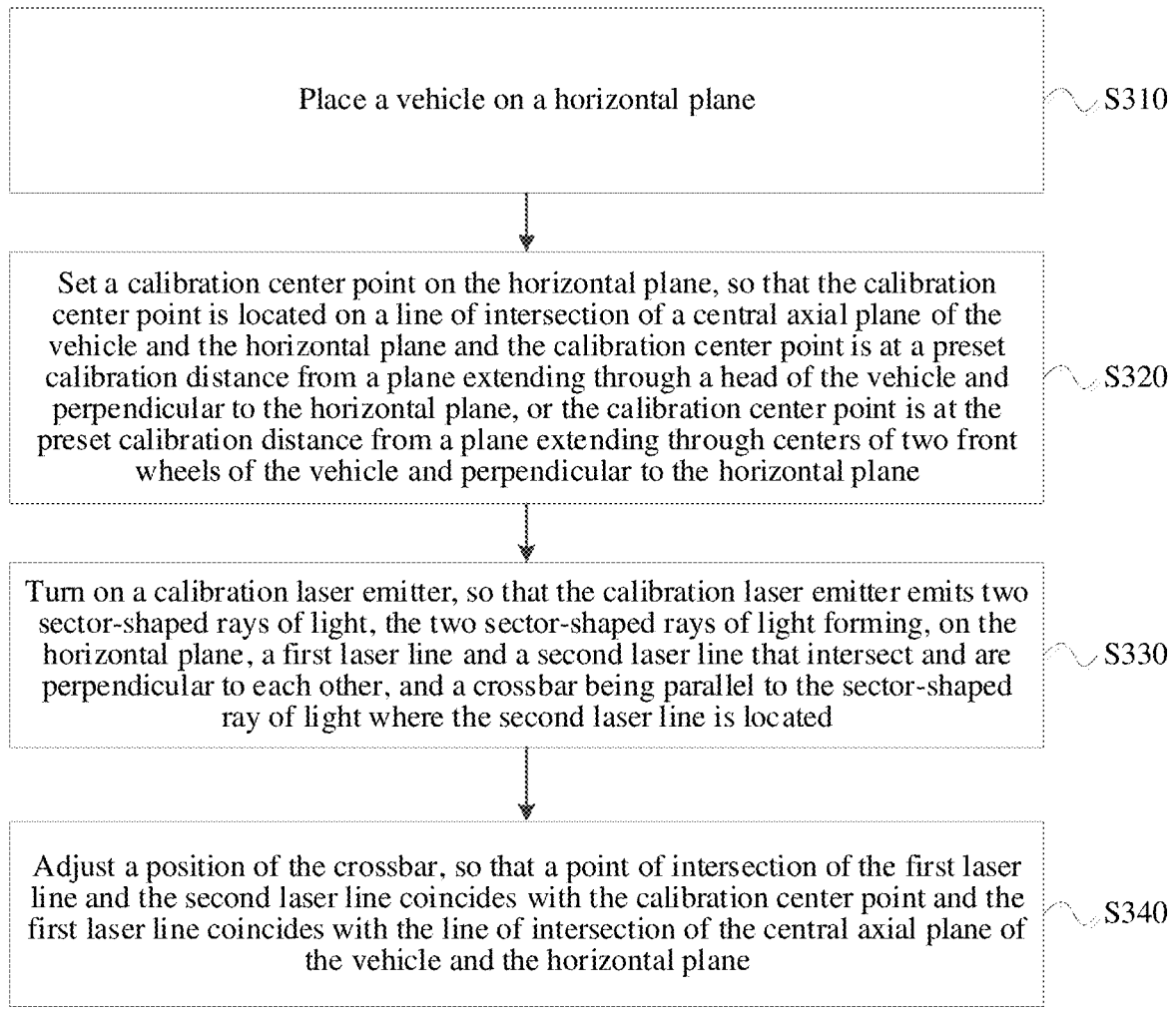
FIG. 8 is a schematic flowchart of aligning a calibration device to a vehicle according to an embodiment of the disclosure.

FIG. 8 is a schematic flowchart of aligning a calibration device to a vehicle according to an embodiment of the disclosure. The method is applied to the application scenario of the method for aligning the calibration device 100 to the vehicle 200 in Embodiment I. Referring to FIG. 8, the method may include but is not limited to the following steps:

S310: Place a vehicle 200 on a horizontal plane.

Figure 9A:
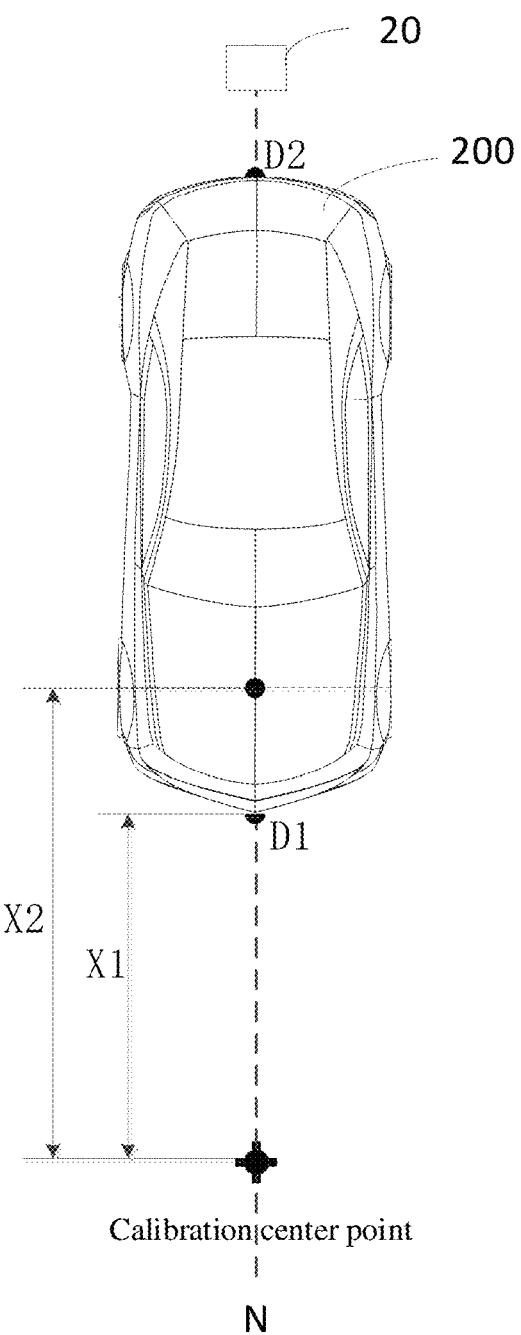
FIG. 9a to FIG. 9d are schematic diagrams of aligning the calibration device to the vehicle in the method shown in FIG. 8.

Referring to FIG. 9a, the vehicle 200 is parked on a horizontal plane. The horizontal plane is the plane where the vehicle 200 is placed and may be parallel or not parallel to the ground. A central axial plane of the vehicle 200 is vertically arranged and perpendicular to the horizontal plane when the vehicle 200 is parked on the horizontal plane. The vehicle 200 may be symmetrical about the central axial plane. For example, the central axial plane of the vehicle 200 is a plane extending through a center point of a head and a center point of a tail of the vehicle 200 and perpendicular to the horizontal plane. Certainly, the vehicle 200 may not be symmetrical about the central axial plane. A central axis of a body of the vehicle 200 is horizontally arranged and is located in the central axial plane of the vehicle 200.

S320: Set a calibration center point on the horizontal plane. In this way, the calibration center point is located on a line of intersection of a central axial plane of the vehicle 200 and the horizontal plane and the calibration center point is at a preset calibration distance from a plane extending through a head of the vehicle 200 and perpendicular to the horizontal plane. Alternatively, the calibration center point is at the preset calibration distance from a plane extending through centers of two front wheels of the vehicle 200 and perpendicular to the horizontal plane.

In this embodiment, referring to FIG. 9a, the vehicle 200 is placed on the horizontal plane. Therefore, the central axial plane of the vehicle 200 and the horizontal plane intersect at a straight line. The straight line is parallel to the central axis of the body of the vehicle 200. The calibration center point is located on the straight line.

In original vehicle calibration regulations, the calibration target is required to be placed at a reference position at a specific distance from the vehicle 200. For example, in original calibration regulations of some vehicles, the calibration target is required to be placed at a position at a specific distance from a center of a head of the vehicle 200. In this case, the calibration center point needs to be at a preset calibration distance from a plane extending through a head of the vehicle 200 and perpendicular to the horizontal plane. In original calibration regulations of some other vehicles, the calibration target is required to be placed at a position at a specific distance from the front wheel. Therefore, the calibration center point needs to be at the preset calibration distance from a plane extending through centers of two front wheels of the vehicle 200 and perpendicular to the horizontal plane, and so on. A preset calibration distance is a distance between a required reference position of the vehicle 200 and a calibration target in the original vehicle calibration regulations. The distance is a distance between the required reference position of the vehicle 200 and the calibration device 100 loading the calibration target in actual operation. For example, as shown in FIG. 9a, when the required reference position of the vehicle 200 is the center of the head of the vehicle 200, the preset calibration distance is X1. When the required reference position of the vehicle 200 is the center of the front wheel of the vehicle 200, the preset calibration distance is X2.

It may be understood that the required reference position of the vehicle 200 may also be a center of the tail of the vehicle 200, a center of a rear wheel or the like. The required reference position of the vehicle 200 may be selected according to requirements in original calibration regulations of different vehicles (which are referred to as "calibration requirements" below). It should be noted that, a user needs to determine the required reference position of the vehicle 200 according to a vehicle model and corresponding original calibration requirements before alignment of the calibration device 100 to the vehicle 200. In this way, the preset calibration distance is determined.

The setting a calibration center point on the horizontal plane may include the following steps:

S321: Set, on the horizontal plane, a first calibration point corresponding to a center of the head of the vehicle 200 and a second calibration point corresponding to a center of a tail of the vehicle 200, and use a straight line where the first calibration point and the second calibration point are located as the line of intersection of the central axial plane of the vehicle 200 and the horizontal plane.

S322: Set the calibration center point on the straight line where the first calibration point and the second calibration point are located and at a position at the preset calibration distance from the plane extending through the head of the vehicle 200 and perpendicular to the horizontal plane.

In this embodiment, S321 specifically includes hanging plumb bobs respectively at the center of the head of the vehicle 200 and the center of the tail of the vehicle 200, and setting the first calibration point and the second calibration point respectively at points of intersection of the plumb bobs and the horizontal plane.

The center of the head of the vehicle and the center of the tail of the vehicle 200 may be determined according to markers such as vehicle logos, license mounting plates, or the like disposed at the head of the vehicle 200 and the tail of the vehicle 200. For example, a center of the vehicle logo is used as the center of the head of the vehicle 200 or the center of the tail of the vehicle 200. Alternatively, a center of the license plate mounting plate is used as the center of the head of the vehicle 200 or the center of the tail of the vehicle 200. An implementation of hanging plumb bobs at the center of the head of the vehicle 200 and the center of the tail of the vehicle respectively may be: hanging a plumb bob at the center of the vehicle logo on the head of the vehicle 200 and a plumb bob at the center of the vehicle logo on the tail of the vehicle 200.

Optionally, one or two plumb bobs may be used. For example, if one plumb bob is used, the plumb bob may be first hung at the center of the head of the vehicle 200. Then the plumb bob is placed at the center of the tail of the vehicle after the first calibration point is set, to set the second calibration point. For another example, if two plumb bobs are used, the plumb bobs may be simultaneously hung at the center of the head of the vehicle 200 and at the center of the tail of the vehicle 200 to simultaneously set the first calibration point and the second calibration point. It should be noted that a line of the plumb bob needs to be sufficiently long, so that a tip of the plumb bob can just come into contact with the horizontal plane.

A specific implementation of setting a straight line extending through both the first calibration point and the second calibration point may be: manually drawing a straight line extending through both a first calibration point D1 and a second calibration point D2 by using a soft ruler or a straight ruler or emitting a straight line extending through both the first calibration point D1 and the second calibration point D2 by using a laser emitter.

In S322, as shown in FIG. 9a, after the straight line where the first calibration point D1 and the second calibration point D2 are located is obtained, the calibration center point is set at a position at the preset calibration distance X1 from the plane extending through the head of the vehicle 200 and perpendicular to the horizontal plane. Specifically, the preset calibration distance X1 is measured manually or is measured by using a distance sensor.

In this embodiment, when the calibration device 100 includes the first calibration laser emitter, S322 may include the following steps:

S3221: Turn on a first calibration laser emitter, so that the first calibration laser emitter forms a first calibration laser line on the horizontal plane.

S3222: Move the first calibration laser emitter, so that the first calibration laser line extends through both the first calibration point and the second calibration point.

S3223: Set the calibration center point on the first calibration laser line and at a position that is on one end of the first calibration point away from the vehicle 200 and that is at the preset calibration distance from the first calibration point.

When the first calibration laser emitter and the calibration laser emitter 20 are the same cross laser emitter, the calibration laser emitter 20 on the calibration bracket 10 may be removed and is adjusted to a single-line mode. The calibration laser emitter 20 is turned on, so that the calibration laser emitter 20 emits a fan-shaped beam. The fan-shaped beam can form a first calibration laser line N on the horizontal plane. The calibration laser emitter 20 is moved, so that the first calibration laser line N formed by the calibration laser emitter 20 extends through both the first calibration point D1 and the second calibration point D2. Therefore, the first calibration laser line N is the straight line where the first calibration point D1 and the second calibration point D2 are located (as shown in FIG. 9a).

After the first calibration laser line N extends through both the first calibration point D1 and the second calibration point D2, the preset calibration distance X1 may be measured and marked on the ground on one end of the first calibration point D1 away from the vehicle 200 by using a ruler according to distance requirements specified in original calibration regulations. The point is where the calibration device 100 should be placed, that is, the calibration center point.

Certainly, in some other embodiments, the first calibration laser emitter and the calibration laser emitter 20 may also be different laser emitters. For example, the first calibration laser emitter may be a single-line laser emitter.

Optionally, in order to achieve the alignment more conveniently, the method may further include: setting a first line segment coinciding with the first calibration laser line by extending through the calibration center point, and setting a second line segment perpendicular to the first line segment by extending through the calibration center point. In this embodiment, as shown in FIG. 9a, a first line segment coinciding with the straight line where the first calibration point D1 and the second calibration point D2 are located is set by extending through the calibration center point, and a second line segment perpendicular to the first line segment is set by extending through the calibration center point. For example, a specific implementation may be: drawing the calibration center point, drawing the first line segment coinciding with the straight line where the first calibration point D1 and the second calibration point D2 are located by extending through the calibration center point, the calibration center point being a midpoint of the first line segment, and then drawing the second line segment perpendicular to the first line segment by extending through the calibration center point, the calibration center point being a midpoint of the second line segment.

S330: Turn on the calibration laser emitter, so that the calibration laser emitter emits two fan-shaped beams, the two fan-shaped beams forming, on the horizontal plane, a first laser line and a second laser line that intersect and are perpendicular to each other, and the crossbar being parallel to the fan-shaped beam where the second laser line is located.

In this embodiment, after the calibration center point is set, the calibration laser emitter 20 is mounted to the calibration bracket 10. The calibration laser emitter 20 may be mounted to the angle adjustment mechanism 13, the vertical rod assembly 11 or the crossbar 12. The switch 22 on the calibration laser emitter 20 is turned to turn on the calibration laser emitter 20. After the calibration laser emitter 20 is turned on, the calibration laser emitter 20 emits two fan-shaped beams. The two fan-shaped beams form, on the horizontal plane, a first laser line M1 and a second laser line M2 that intersect and are perpendicular to each other. In addition, the fan-shaped beam where the second laser line M2 emitted by the calibration laser emitter 20 is located is parallel to the crossbar 12 of the calibration bracket 10. Therefore, when the crossbar 12 of the calibration bracket 10 is parallel to the vehicle 200, the calibration target on the crossbar 12 is also parallel to the vehicle 200.

S340: Adjust a position of the crossbar, so that a point of intersection of the first laser line and the second laser line coincides with the calibration center point and the first laser line coincides with the line of intersection of the central axial plane of the vehicle 200 and the horizontal plane.

In this embodiment, a specific implementation of S340 may be: initially moving the calibration bracket 10, so that a center of the pedestal 14 of the calibration bracket 10 substantially coincides with the calibration center point; determining, by means of observation, whether the first laser line M1 extends through both the first calibration point D1 and the second calibration point D2; and if yes, completing the alignment of the calibration device 100 to the vehicle 200, or if not, continuing to adjust a position of the crossbar 12.

In some other embodiments, when the first line segment and the second line segment are set, whether the first laser line M1 extends through both the first calibration point D1 and the second calibration point D2 may be determined by determining, by means of observation, whether the first laser line M1 coincides with the first line segment.

Figure 9B:
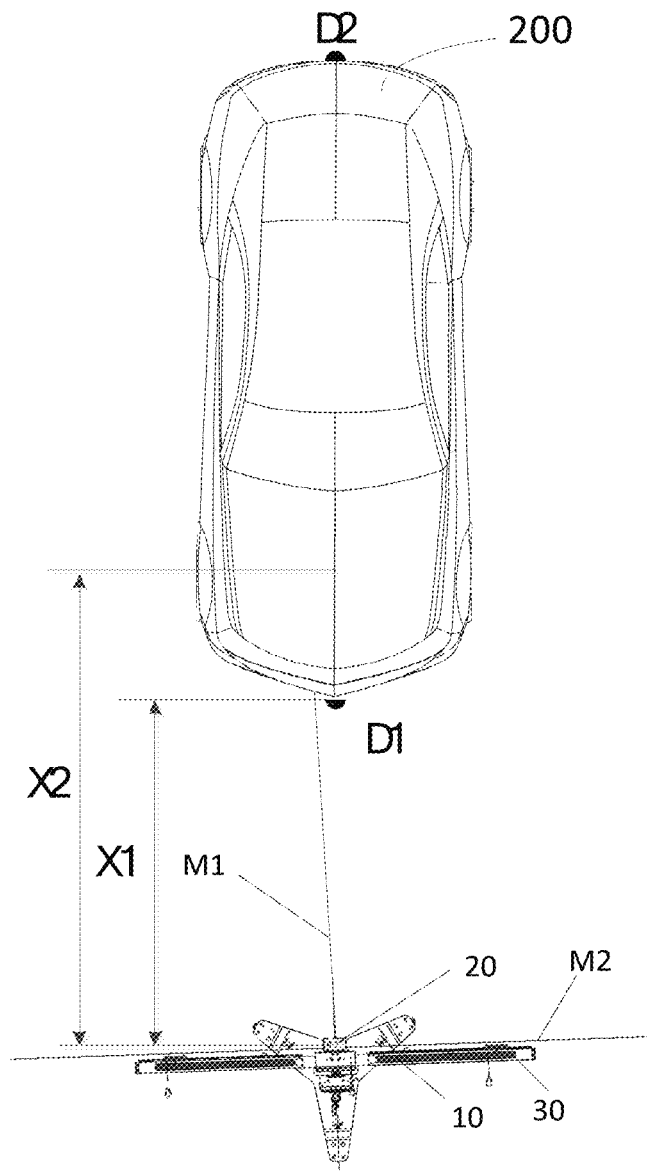
Figure 9C:
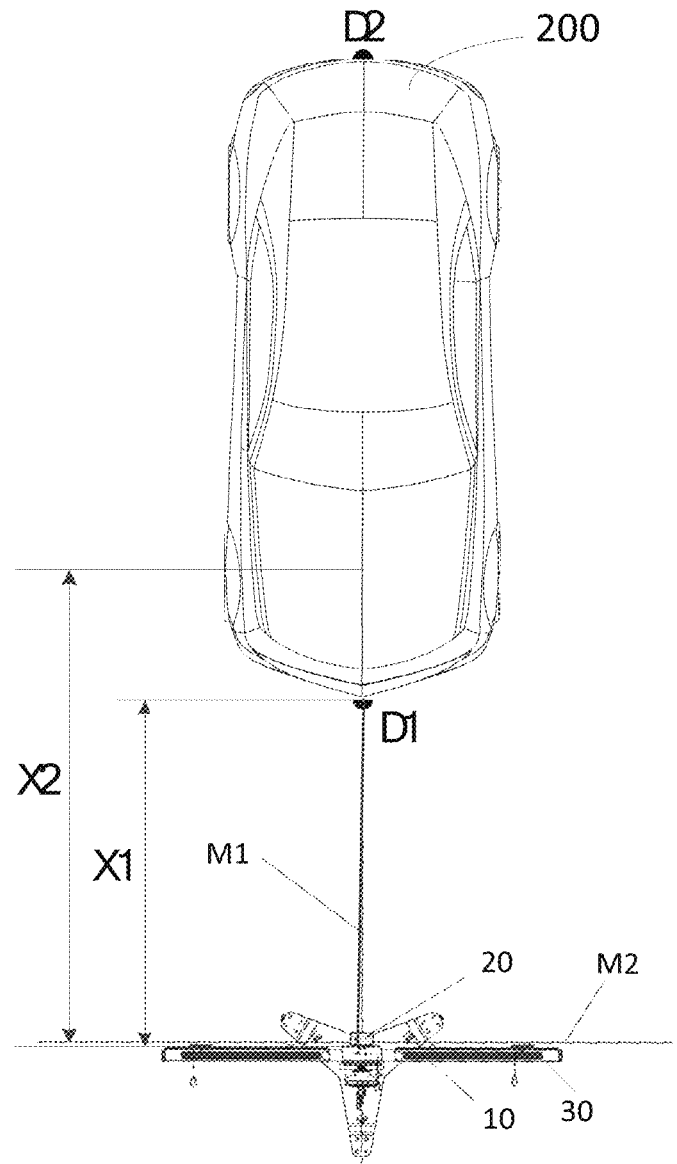

As shown in FIG. 9b, when the point of intersection of the first laser line M1 and the second laser line M2 coincides with the calibration center point, the first laser line M1 does not extend through both the first calibration point D1 and the second calibration point D2. In this case, the first laser line M1 does not coincide with the line of intersection of the central axial plane of the vehicle 200 and the horizontal plane, and the position of the crossbar 12 still needs to be adjusted to complete the alignment of the calibration device 100 to the vehicle 200. As shown in FIG. 9c, when the point of intersection of the first laser line M1 and the second laser line M2 coincides with the calibration center point, the first laser line M1 extends through both the first calibration point D1 and the second calibration point D2. In this case, the first laser line M1 coincides with the line of intersection of the central axial plane of the vehicle 200 and the horizontal plane, and the alignment of the calibration device 100 to the vehicle 200 is completed. Therefore, the position of the crossbar 12 does not need to be adjusted.

In this embodiment, the position of the crossbar 12 is adjusted by moving the calibration bracket 10 or adjusting the angle adjustment mechanism 13 on the calibration bracket 10.

In this embodiment, when the position of the crossbar 12 still needs to be adjusted, S340 includes the following step.

Figure 9D:
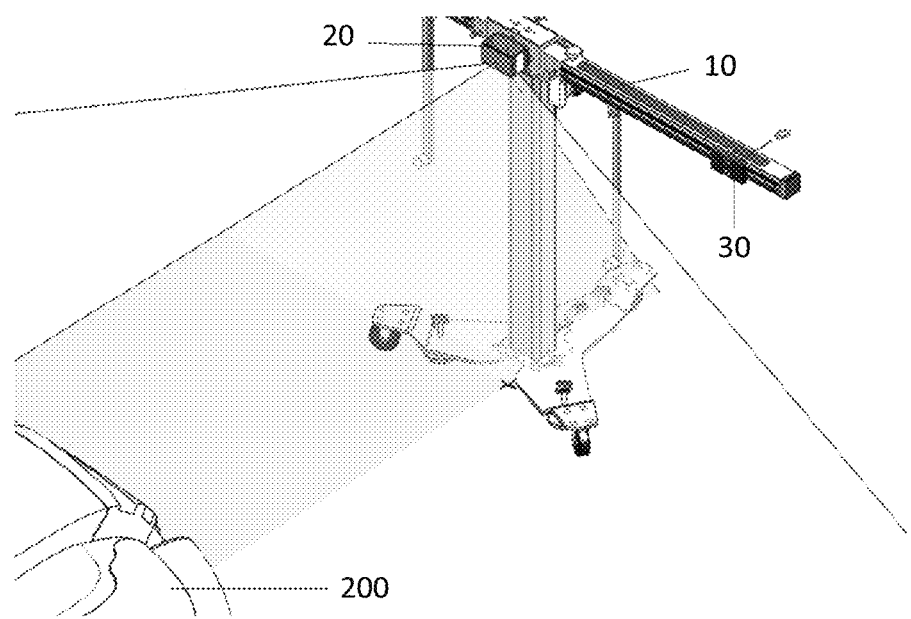

S341: Adjust the point of intersection of the first laser line and the second laser line to coincide with the calibration center point, and adjust the angle adjustment mechanism, so that the first laser line and the calibration center point coincide with a straight line where a preset calibration point is located. A specific implementation of S341 may be: after the point of intersection of the first laser line M1 and the second laser line is adjusted to coincide with the calibration center point, determining, by means of observation, whether the first laser line M1 extends through both the first calibration point D1 and the second calibration point D2, and if not, adjusting the angle adjustment mechanism 13 of the calibration bracket 10. Therefore, the crossbar 12 is rotated relative to the vertical rod assembly 11 and drives the calibration laser emitter 20 to rotate relative to the vertical rod assembly 11, until the first laser line M1 extends through the first calibration point D1 (as shown in FIG. 9c and FIG. 9d). In this way, the alignment of the calibration device 100 to the vehicle 200 is completed.

In this embodiment, the calibration center point at the preset calibration distance from the plane extending through the head of the vehicle 200 and perpendicular to the horizontal plane or at the preset calibration distance from the plane extending through the centers of the two front wheels of the vehicle 200 and perpendicular to the horizontal plane is set on the horizontal plane on which the vehicle 200 is placed. The calibration laser emitter 20 disposed on the calibration bracket 10 is turned on, so that the calibration laser emitter 20 emits two fan-shaped beams. The two fan-shaped beams form, on the horizontal plane, the first laser line M1 and the second laser line M2 that intersect and are perpendicular to each other. The crossbar 12 of the calibration bracket 10 is adjusted, so that the point of intersection of the first laser line M1 and the second laser line M2 coincides with the calibration center point and the first laser line M1 coincides with the line of intersection of the central axial plane of the vehicle 200 and the horizontal plane. Therefore, alignment of the calibration device 100 to the vehicle 200 is adjusted. In this way, the alignment of the calibration device 100 to the vehicle 200 can be easily and quickly achieved. The method is applicable to various vehicle models.

Embodiment III

Figure 10:
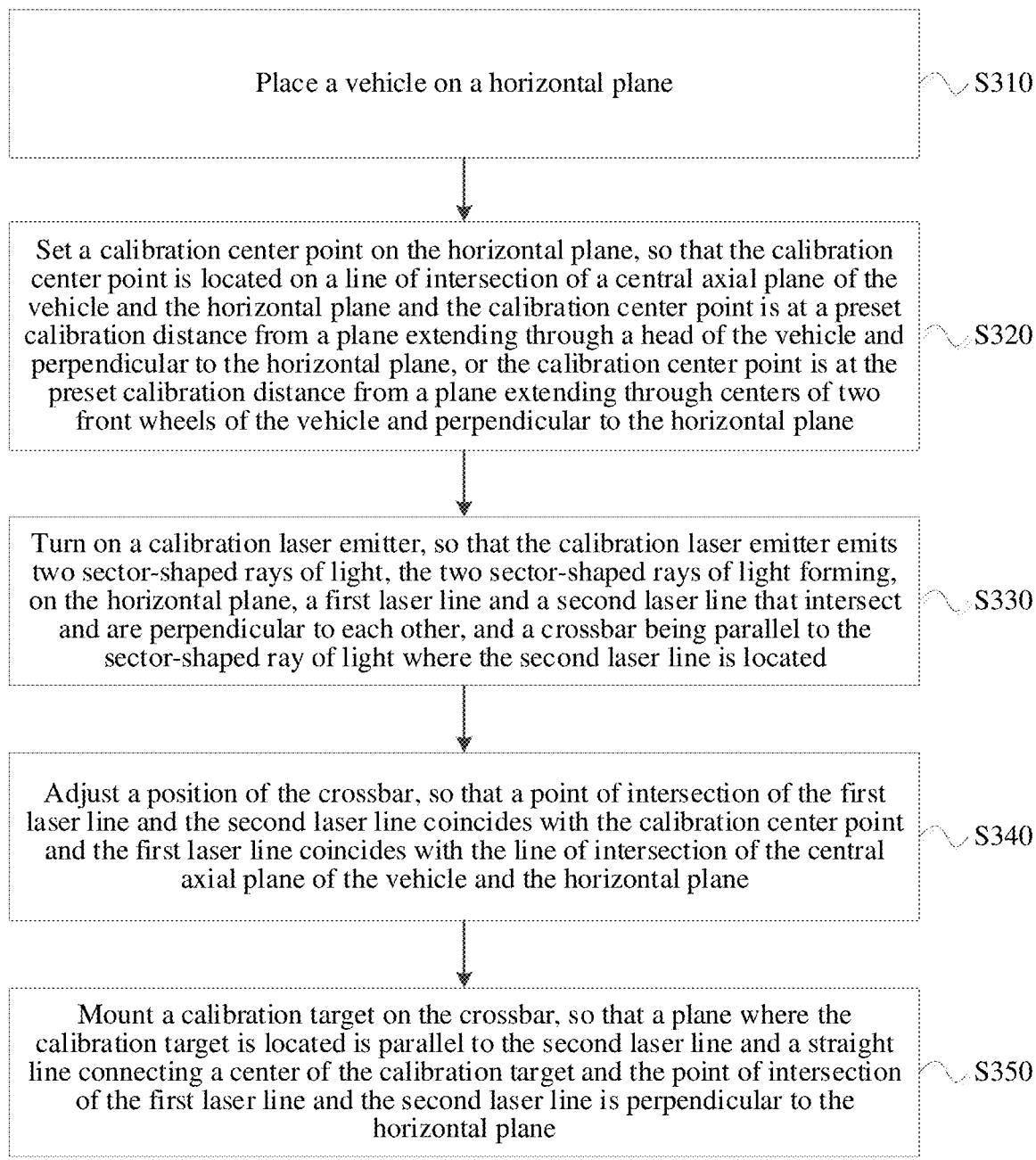
FIG. 10 is another schematic flowchart of aligning the calibration device to the vehicle according to an embodiment of the disclosure.

On the basis of Embodiment II, the disclosure further provides another method for aligning a calibration device 100 to a vehicle 200. The method is applicable to the application scenario of the method for aligning a calibration device 100 to a vehicle 200 in Embodiment I. Referring to FIG. 10, the method may include but is not limited to the following steps:

S350: Mount the calibration target on the crossbar, so that a plane where the calibration target is located is parallel to the second laser line, and a straight line connecting a center of the calibration target and the point of intersection of the first laser line and the second laser line is perpendicular to the horizontal plane.

In this embodiment, as shown in FIG. 9b to FIG. 9d, when the calibration device 100 further includes a calibration target 30, the calibration target 30 is mounted to the crossbar 12 of the calibration bracket 10, to subsequently calibrate the vehicle 200 by using the calibration target 30. For example, when the calibration target 30 is a reflector, there may be two reflectors. The two reflectors may be mounted to the crossbar 12 by using a slider and a guide rail. The slider is mounted in the guide rail, so that the slider is slidable along the guide rail with the reflector. The slider and the guide rail are respectively disposed on the first crossbar portion 121 and the second crossbar portion 122. For another example, when the calibration target 30 is a pattern plate, the pattern plate may be disposed on the crossbar 12 by using support members and the guide rail. The guide rail is disposed in the crossbar 12, and the support members are disposed in the guide rail. The two support members are respectively disposed on opposite sides of the pattern board and jointly support the pattern plate.

When there are two calibration targets 30, a center of the calibration targets 30 is a midpoint of a line connecting centers of the two calibration targets 30. When there is one calibration target 30 or more than two calibration targets, a center of the calibration target 30 is a geometric center of the calibration target(s) 30.

When a straight line connecting the center of the calibration target 30 and the point of intersection of the first laser line M1 and the second laser line M2 is perpendicular to the horizontal plane, the calibration target 30 is symmetrical about the central axial plane of the vehicle 200. This facilitates calibration of on-board elements (such as a front windshield camera) on the vehicle 200.

Those skilled in the art may understand that the point of intersection of the first laser line M1 and the second laser line M2 may substantially be located on the plane where the calibration element is located. Specifically, the point is located on a calibration element plane at a specific distance from a specific reference point of the vehicle 200 specified in the original calibration specifications, such as a plane where a pattern of the calibration target is located or a radar reflection or absorption plane. When the calibration element needs to be placed on a central axis of the vehicle 200, the point of intersection may coincide with a projection of the center of the calibration element (for example, the calibration target 30 described above) on the horizontal plane. When calibration element does not need to be placed on the central axis of the vehicle 200, for example, when the calibration element (for example, a radar reflector) does not need to be placed on the central axis of the vehicle 200 during calibration of on-board anti-collision radars for many vehicle models, the point of intersection only needs to be located in the plane where the calibration element is located. In order to ensure compatibility with calibration elements of various types, when the point of intersection of the laser lines fails to be located in planes where the calibration elements of all of the types are located, a distance difference between the point of intersection of the laser lines and the calibration component lane may be compensated for by using any means such as software, additional hardware, or the like.

It should be noted that, the calibration target 30 may be mounted to the crossbar 12 either before the calibration laser emitter 20 is mounted to the crossbar 12 or after the calibration laser emitter 20 is mounted to the crossbar 12, as long as the straight line connecting the center of the calibration target 30 and the point of intersection of the first laser line M1 and the second laser line M2 can be perpendicular to the horizontal plane by adjusting the calibration target 30 after the calibration laser emitter 20 is turned on.

In this embodiment, the straight line connecting the center of the calibration target 30 and the point of intersection of the first laser line M1 and the second laser line M2 formed by the calibration laser emitter 20 is caused to be perpendicular to the horizontal plane.

Therefore, the calibration target 30 is symmetrical about the central axial plane of the vehicle 200, facilitating subsequent calibration of the on-board components on the vehicle 200.

Embodiment IV

When the required reference position of the vehicle 200 is the centers of the front wheels, that is, when the calibration center point is at the preset calibration distance X2 from the plane extending through the centers of the two front wheels of the vehicle 200 and perpendicular to the horizontal plane, measurement of the preset calibration distance X2 is inconvenient.

In order to measure the preset calibration distance X2 more conveniently, on the basis of Embodiment II, the disclosure further provides still another method for aligning a calibration device 100 to a vehicle 200. The method is applicable to the application scenario of the method for aligning the calibration device 100 to the vehicle 200 in Embodiment I. The method may further include but is not limited to the following steps:

S361: Acquire, according to a model of the vehicle 200, the preset calibration distance and a distance from the plane extending through the head of the vehicle 200 and perpendicular to the horizontal plane to the plane extending through the centers of the two front wheels of the vehicle 200 and perpendicular to the horizontal plane.

S362: Determine a preset alignment distance according to the preset calibration distance and the distance from the plane extending through the head of the vehicle 200 and perpendicular to the horizontal plane to the plane extending through the centers of the two front wheels of the vehicle 200 and perpendicular to the horizontal plane.

In this embodiment, the application scenario may further include a terminal. The terminal pre-stores preset calibration distances corresponding to various vehicle models and a distance between a center between the two front wheels of the vehicle 200 and the center of the head of the vehicle 200. When a user inputs a model of a current vehicle to the terminal, the terminal displays a corresponding preset calibration distance and a distance between a center between two front wheels of the vehicle 200 and a center of a head of the vehicle 200. The preset alignment distance is a difference between the preset calibration distance and the distance between the center between the two front wheels of the vehicle 200 and the center of the head of the vehicle 200. After the preset calibration distance and the distance between the center between the two front wheels of the vehicle 200 and the center of the head of the vehicle 200 are acquired, the preset alignment distance may be determined. Therefore, a distance between the center of the head of the vehicle 200 and the calibration center point may be determined according to the preset calibration distance. For example, if a preset calibration distance corresponding to the vehicle 200 is 50, and a distance between a front wheel of the vehicle 200 and a head of the vehicle 200 is 20, the preset alignment distance is 50−20=30.

In this embodiment, Step 320 may include the following steps.

S321: Set, on the horizontal plane, a first calibration point corresponding to a center of the head of the vehicle 200 and a second calibration point corresponding to a center of a tail of the vehicle 200, and use a straight line where the first calibration point and the second calibration point are located as the line of intersection of the central axial plane of the vehicle 200 and the horizontal plane.

S323: Set the calibration center point on the straight line where the first calibration point and the second calibration point are located and at a position at the preset calibration distance from the plane extending through a line connecting the centers of the two front wheels of the vehicle 200 and perpendicular to the horizontal plane.

S323 specifically includes setting the calibration center point on the straight line where the first calibration point D1 and the second calibration point D2 are located and at a position that is on one end of the first calibration point D1 away from the vehicle 200 and that is at the preset calibration distance from the first calibration point D1.

In this embodiment, the preset alignment distance is determined according to the preset calibration distances for different vehicle models. By measuring a point at the preset alignment distance from the center of the head of the vehicle 200, a position of the calibration center point can be easily determined.

Embodiment V

When the required reference position of the vehicle 200 is the centers of the front wheels, that is, when the calibration center point is at the preset calibration distance X2 from the plane extending through the centers of the two front wheels of the vehicle 200 and perpendicular to the horizontal plane, measurement of the preset calibration distance X2 is inconvenient.

In order to more conveniently determine the position of the calibration center point, on the basis of Embodiment II, the disclosure further provides yet another method for aligning a calibration device 100 to a vehicle 200. The method is applicable to the application scenario of the method for aligning the calibration device 100 to the vehicle 200 in Embodiment I. The method may further include but is not limited to the following steps:

S410: Place a vehicle 200 on a horizontal plane.

S420: Set a calibration center point on the horizontal plane, so that the calibration center point is located on a line of intersection of a central axial plane of the vehicle 200 and the horizontal plane and the calibration center point is at a preset calibration distance from a plane extending through a head of the vehicle 200 and perpendicular to the horizontal plane, or the calibration center point is at the preset calibration distance from a plane extending through centers of two front wheels of the vehicle 200 and perpendicular to the horizontal plane.

S430: Turn on the calibration laser emitter, so that the calibration laser emitter emits two fan-shaped beams, the two fan-shaped beams forming, on the horizontal plane, a first laser line and a second laser line that intersect and are perpendicular to each other, and the crossbar being parallel to the fan-shaped beam where the second laser line is located.

S440: Adjust a position of the crossbar, so that a point of intersection of the first laser line and the second laser line coincides with the calibration center point and the first laser line coincides with the line of intersection of the central axial plane of the vehicle 200 and the horizontal plane.

S410, S430 and S440 are respectively the same as S310, S330 and S340 in Embodiment II, and therefore are not described in detail in this embodiment again.

As shown in FIG. 11, S420 of setting the calibration center point on the horizontal plane may include the following step:

S421: Set, on the horizontal plane, a first calibration point corresponding to a center of the head of the vehicle 200 and a second calibration point corresponding to a center of a tail of the vehicle 200, and use a straight line where the first calibration point and the second calibration point are located as the line of intersection of the central axial plane of the vehicle and the horizontal plane.

Figure 12A:
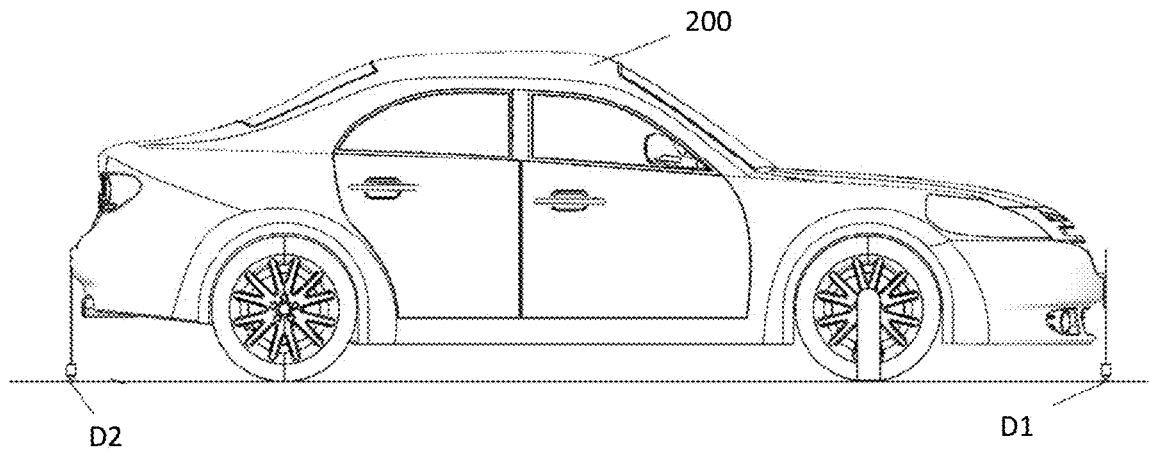
FIG. 12a to FIG. 12e are schematic diagrams of a process of determining a position of a calibration center point in the method shown in FIG. 11.

In this embodiment, as shown in FIG. 12a, S421 specifically includes hanging plumb bobs respectively at the center of the head of the vehicle 200 and the center of the tail of the vehicle 200, and setting the first calibration point D1 and the second calibration point D2 respectively at points of intersection of the plumb bobs and the horizontal plane.

S422: Set, on the horizontal plane and respectively on both sides of the central axial plane of the vehicle 200 and according to the first calibration point and the second calibration point, a third calibration point and a fourth calibration point equidistant from the central axial plane of the vehicle 200, where a line connecting the third calibration point and the fourth calibration point is perpendicular to the central axial plane of the vehicle 200.

When the calibration device 100 includes the second calibration laser emitter and the auxiliary target 210, S422 may include the following steps:

S4220: Place two auxiliary targets respectively on the front wheels of the vehicle 200, each of the auxiliary targets including a vertical portion and a support portion, the vertical portion being perpendicularly connected to the support portion and abutting against the front wheel of the vehicle 200, a central axis of the vertical portion extending through a center point of the front wheel of the vehicle 200, and the support portion being placed on the horizontal plane.

S4221: Turn on a second calibration laser emitter, so that the second calibration laser emitter forms a calibration laser point, a second calibration laser line and a third calibration laser line on the horizontal plane, the second calibration laser line and the third calibration laser line being perpendicular to each other and intersecting at the calibration laser point.

S4222: Move the second calibration laser emitter, so that the calibration laser point coincides with the first calibration point and the second calibration laser line extends through both the first calibration point and the second calibration point.

S4223: Set, on the third calibration laser line and respectively on both sides of the first calibration point, a first reference point and a second reference point equidistant from the first calibration point.

S4224: Move the second calibration laser emitter, so that the calibration laser point coincides with the first reference point and the third calibration laser line extends through the first calibration point, and setting the third calibration point at a point of intersection of the second calibration laser line and the support portion of one of the auxiliary targets.

S4225: Move the second calibration laser emitter, so that the calibration laser point coincides with the second reference point and the third calibration laser line extends through the first calibration point, and setting the fourth calibration point at a point of intersection of the second calibration laser line and the support portion of the other of the auxiliary targets.

Figure 12B:
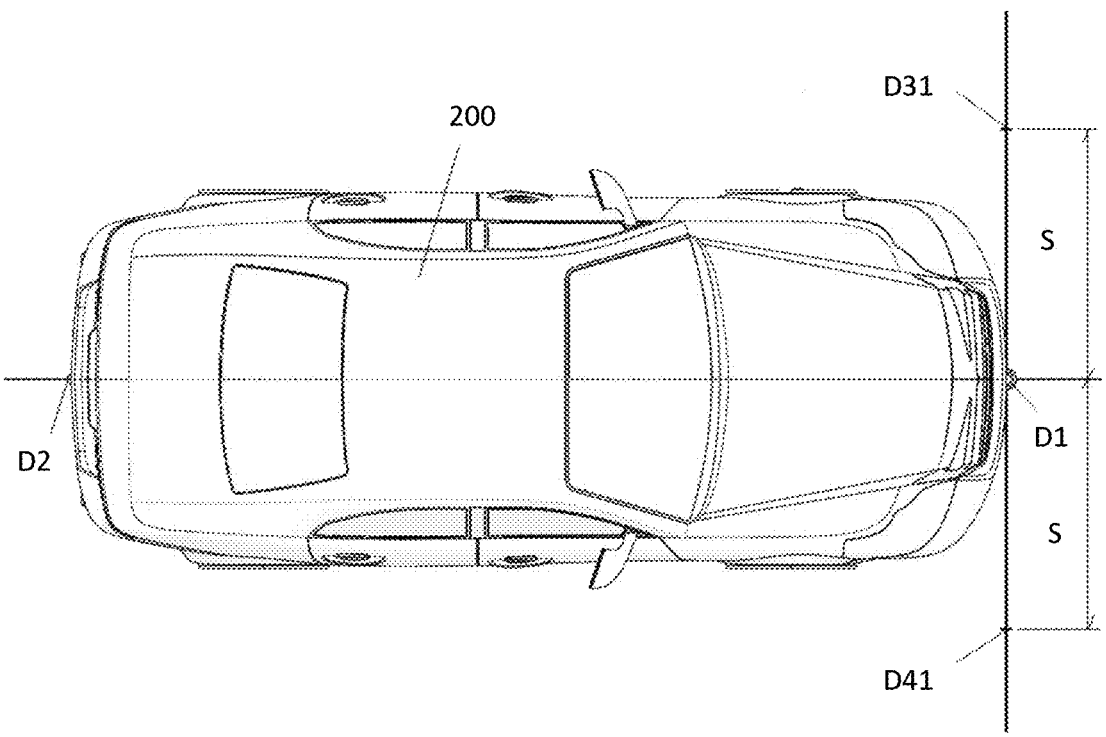

In this embodiment, the second calibration laser emitter may be a five-line laser emitter. When the second calibration laser emitter is turned on, the second calibration laser emitter forms a calibration laser point, a second calibration laser line and a third calibration laser line on the horizontal plane. The second calibration laser line and the third calibration laser line are perpendicular to each other and intersect at the calibration laser point. In S4222, the second calibration laser emitter is moved, so that the calibration laser point coincides with the first calibration point D1. When the second calibration laser line extends through both the first calibration point D1 and the second calibration point D2, the third calibration laser line is perpendicular to the second calibration laser line. That is to say, the third calibration laser line is perpendicular to the central axial plane of the vehicle 200. In S4223, as shown in FIG. 12b, after the second calibration laser emitter is already placed, the same distance S is taken on the third calibration laser line and on both sides of the first calibration point D1 to draw a first reference point D31 and a second reference point D41 on the horizontal plane. The distance S may be greater than half of a width of the vehicle 200, so that all of the calibration points are outside a body of the vehicle 200.

Figure 12C:
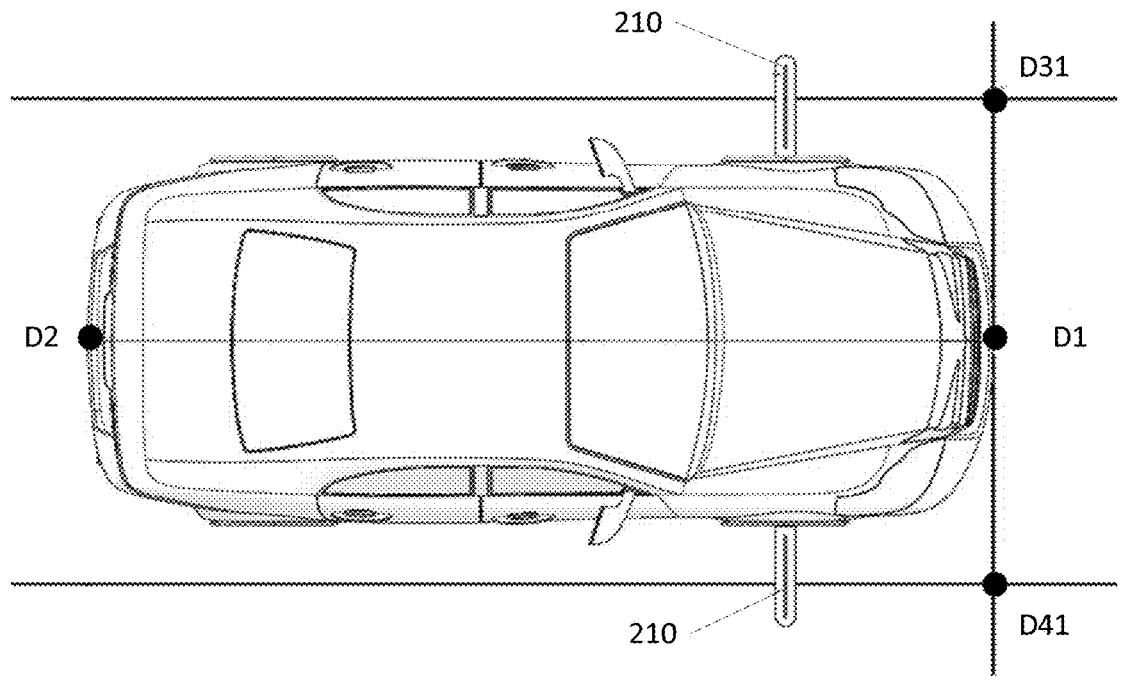
Figure 12D:
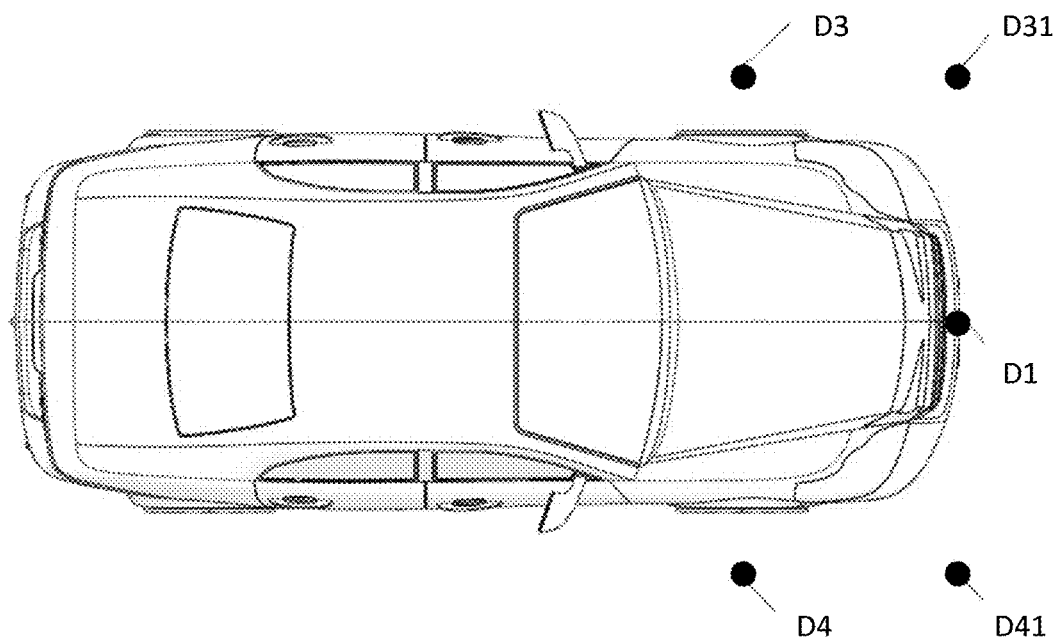

In S4224 and S4225, the third calibration point D3 and the fourth calibration point D4 may be determined by using the auxiliary target 210. The auxiliary target 210 has the support portion 212. In this case, S422 may further include: setting a third calibration point and a fourth calibration point in the through groove. As shown in FIG. 12c and FIG. 12d, the second calibration laser emitter is moved from the first calibration point D1 toward the first reference point D31, so that the calibration laser point coincides with the first reference point D31. The third calibration laser line extends through the first calibration point D1. In this case, the second calibration laser line extends through the support portion 212 of one of the auxiliary targets 210 and extends through the through groove 213 to set the third calibration point D3 on the horizontal plane. Likewise, the second calibration laser emitter is removed from the first reference point D31 toward the second reference point D41, so that the calibration laser point coincides with the second reference point D41. The third calibration laser line extends through the first calibration point D1. In this case, the second calibration laser line extends through the support portion 212 of the other of the auxiliary targets 210 and extends through the through groove 213 to set the fourth calibration point D4 on the horizontal plane. In this way, distances between the third calibration point D3 and the fourth calibration point D4 and the central axial plane of the vehicle 200 are S.

In this embodiment, when the auxiliary target 210 is disposed on the front wheel of the vehicle 200, the vertical portion 211 abuts against the front wheel of the vehicle 200, the central axis of the vertical portion 211 extends through the center point of the front wheel of the vehicle 200, and the support portion 212 is placed on the horizontal plane where the vehicle 200 is placed. This assists in alignment of the calibration device to the vehicle 200. In this way, alignment of the calibration device to the vehicle 200 can be easily and quickly achieved. The method is applicable to various vehicle models.

S423: Set, on the horizontal plane, a fifth calibration point at the preset calibration distance from the third calibration point, where a line connecting the third calibration point and the fifth calibration point is parallel to the central axial plane of the vehicle 200.

S424: Set, on the horizontal plane, a sixth calibration point at the preset calibration distance from the fourth calibration point, where a line connecting the fourth calibration point and the sixth calibration point is parallel to the central axial plane of the vehicle 200.

Figure 12E:
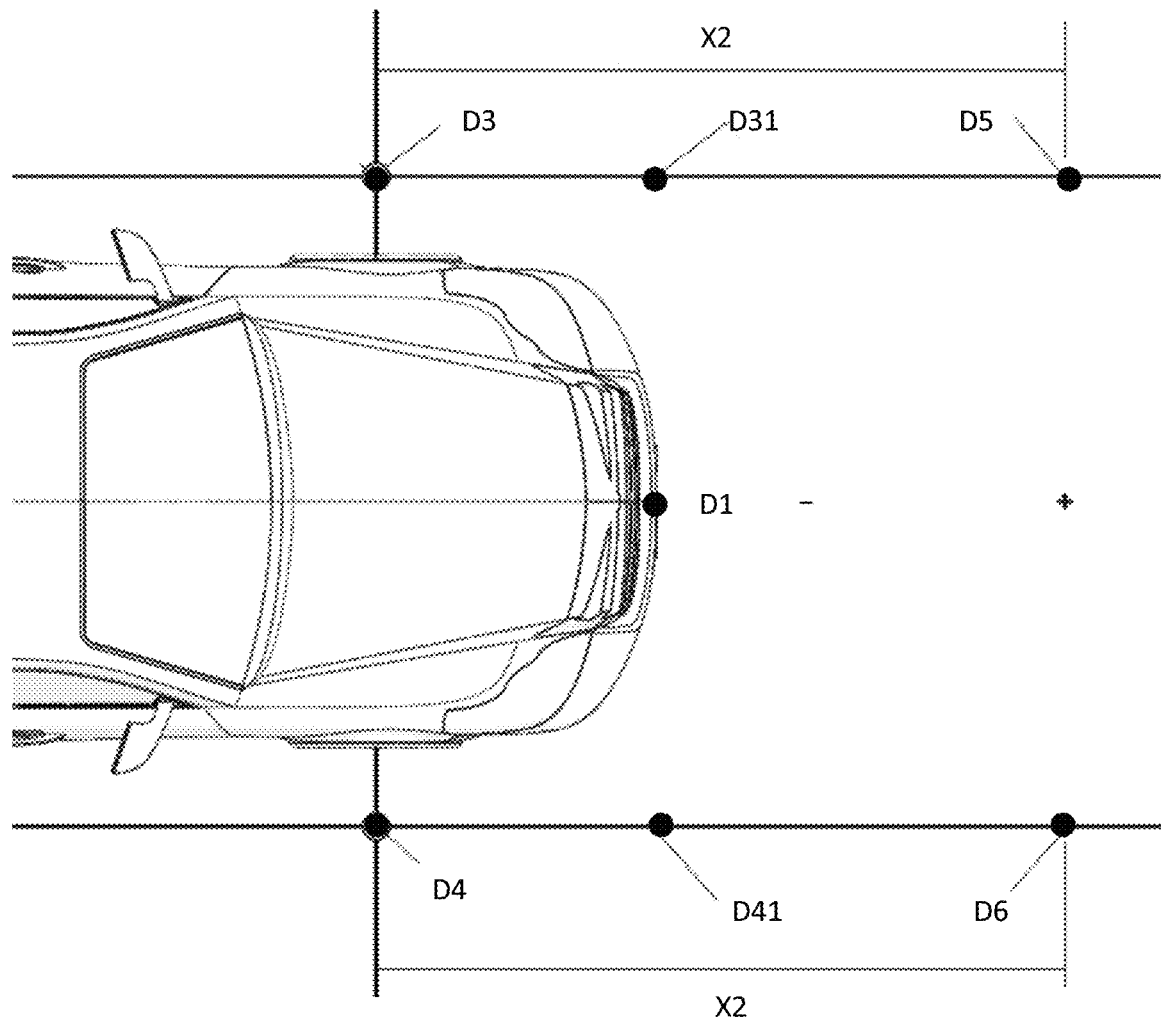

In this embodiment, As shown in FIG. 12e, after the third calibration point D3 and the fourth calibration point D4 are determined, a fifth calibration point and a sixth calibration point may be set by using the second calibration laser emitter. A specific implementation may be: adjusting the second calibration laser emitter to the single-line mode, so that the second calibration laser emitter forms a second calibration laser line (or a third calibration laser line) on the horizontal plane, moving the second calibration laser emitter, so that the second calibration laser line (or the third calibration laser line) extends through both the third calibration point D3 and the first reference point D31 to set the fifth calibration point D5 at a position at the preset calibration distance X2 from the third calibration point D3, and correspondingly moving the second calibration laser emitter, so that the second calibration laser line (or the third calibration laser line) extends through both the fourth calibration point D4 and the second reference point D41 to set the sixth calibration point D6 at a position at the preset calibration distance X2 from the fourth calibration point D4. In this way, a line connecting the third calibration point D3 and the fifth calibration point D5 is parallel to the central axial plane of the vehicle 200, and a line connecting the fourth calibration point D4 and the sixth calibration point D6 is parallel to the central axial plane of the vehicle 200.

S425: Determine a midpoint of a line connecting the fifth calibration point and the sixth calibration point.

A midpoint of a line between the fifth calibration point and the sixth calibration point may be determined by means measurement or may be determined more quickly in other manners, to determine the position of the calibration center point.

In this embodiment, S425 specifically includes the following steps:

S4251: Move the second calibration laser emitter, so that the second calibration laser line extends through both the first calibration point and the second calibration point and the third calibration laser line extends through both the fifth calibration point and the sixth calibration point.

S4252: Set, on the horizontal plane, a point coinciding with the calibration laser point as the midpoint of the line connecting the fifth calibration point and the sixth calibration point.

In this embodiment, the midpoint of the line between the fifth calibration point D5 and the sixth calibration point D6 may be determined by using the second calibration laser emitter. A specific implementation is: adjusting the second calibration laser emitter to the five-line mode, so that the second calibration laser emitter forms a calibration laser point, a second calibration laser line and a third calibration laser line on the horizontal plane, and moving the second calibration laser emitter to such a position that the second calibration laser line extends through both the first calibration point D1 and the second calibration point D2 and the third calibration laser line extends through both the fifth calibration point D5 and the sixth calibration point D6. In this case, a position of the calibration laser point formed by the second calibration laser emitter on the horizontal plane is the midpoint of the line between the fifth calibration point D5 and the sixth calibration point D6.

S426: Use the midpoint of the line connecting the fifth calibration point and the sixth calibration point as the calibration center point.

In this embodiment, when a preset calibration position is a front wheel, the position of the calibration center point is quickly and conveniently determined by using the second calibration laser emitter and the auxiliary target.

Embodiment VI

In order more simplify the operations in Embodiment V to more conveniently determine the position of the calibration center point, as shown in FIG. 13 and FIG. 14a to FIG. 14e, S420 of setting the calibration center point on the horizontal plane may include the following steps:

S421: Set, on the horizontal plane, a first calibration point D1 corresponding to a center of the head of the vehicle 200 and a second calibration point D2 corresponding to a center of a tail of the vehicle 200, and use a straight line where the first calibration point D1 and the second calibration point D2 are located as the line of intersection of the central axial plane of the vehicle and the horizontal plane.

S427: Set, on the horizontal plane and on a side of the central axial plane of the vehicle 200 and according to the first calibration point and the second calibration point, a third calibration point equidistant from the central axial plane of the vehicle 200.

When the calibration device 100 includes the second calibration laser emitter and the auxiliary target 210, S427 may include the following steps:

S4270: Place an auxiliary target on one of the front wheels of the vehicle 200, the auxiliary target including a vertical portion and a support portion, the vertical portion being perpendicularly connected to the support portion and abutting against the front wheel of the vehicle 200, a central axis of the vertical portion extending through a center point of the front wheel of the vehicle 200, and the support portion being placed on the horizontal plane.

S4271: Turn on a second calibration laser emitter, so that the second calibration laser emitter forms a calibration laser point, a second calibration laser line and a third calibration laser line on the horizontal plane, the second calibration laser line and the third calibration laser line being perpendicular to each other and intersecting at the calibration laser point.

S4272: Move the second calibration laser emitter, so that the calibration laser point coincides with the first calibration point and the second calibration laser line extends through both the first calibration point and the second calibration point.

S4273: Set a first reference point on the third calibration laser line and on one side of the first calibration point.

S4274: Move the second calibration laser emitter, so that the calibration laser point coincides with the first reference point and the third calibration laser line extends through the first calibration point, and set the third calibration point at a point of intersection of the second calibration laser line and the support portion of the auxiliary target.

Figure 14B:
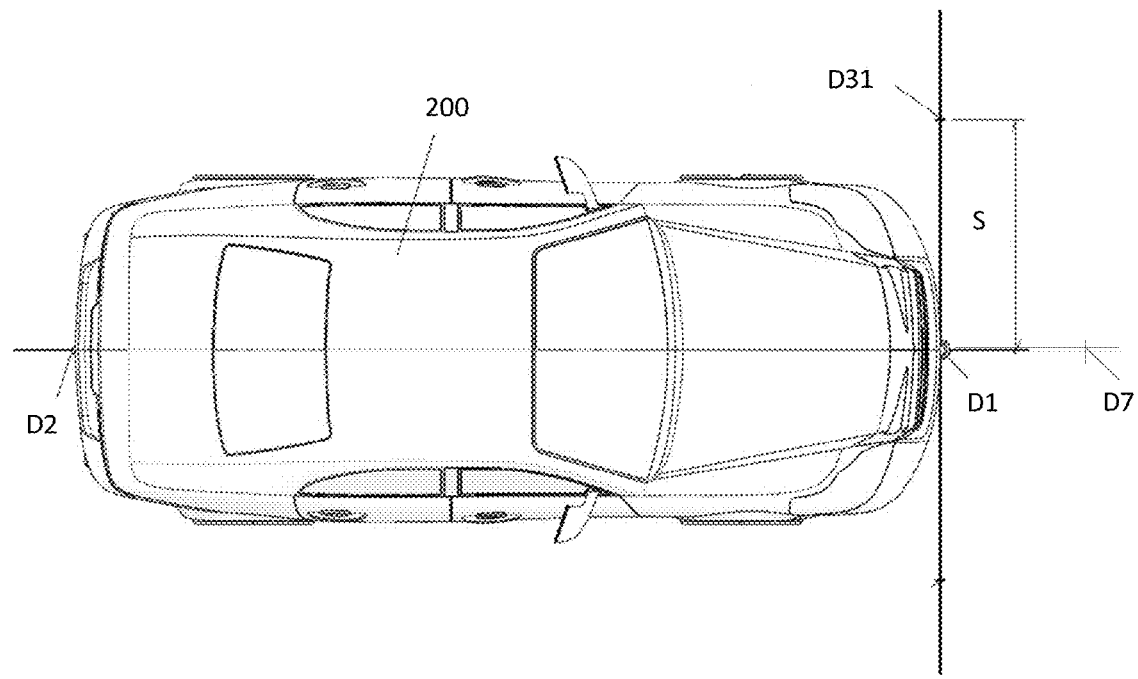
Figure 14C:
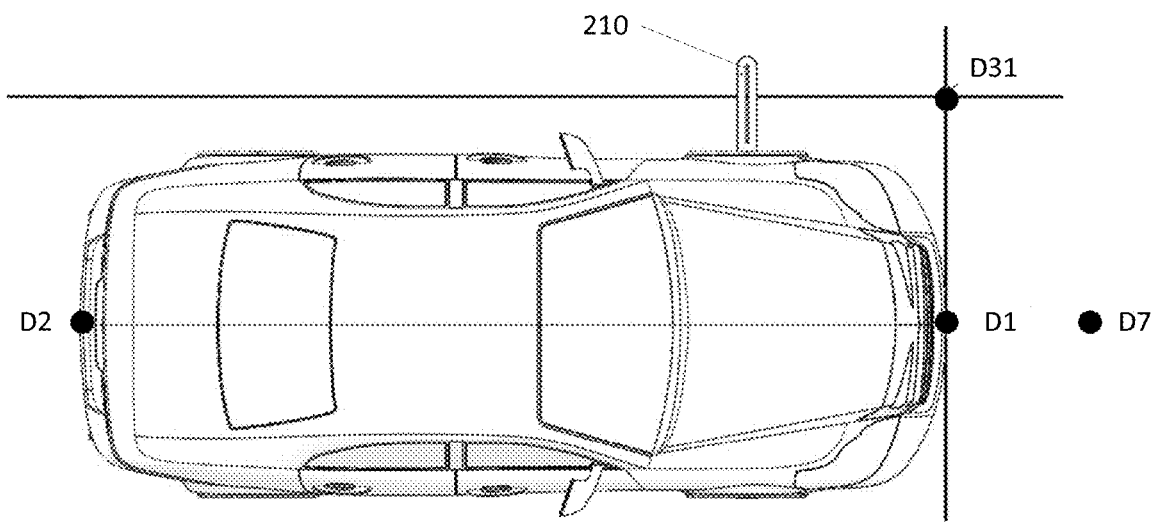
Figure 14D:
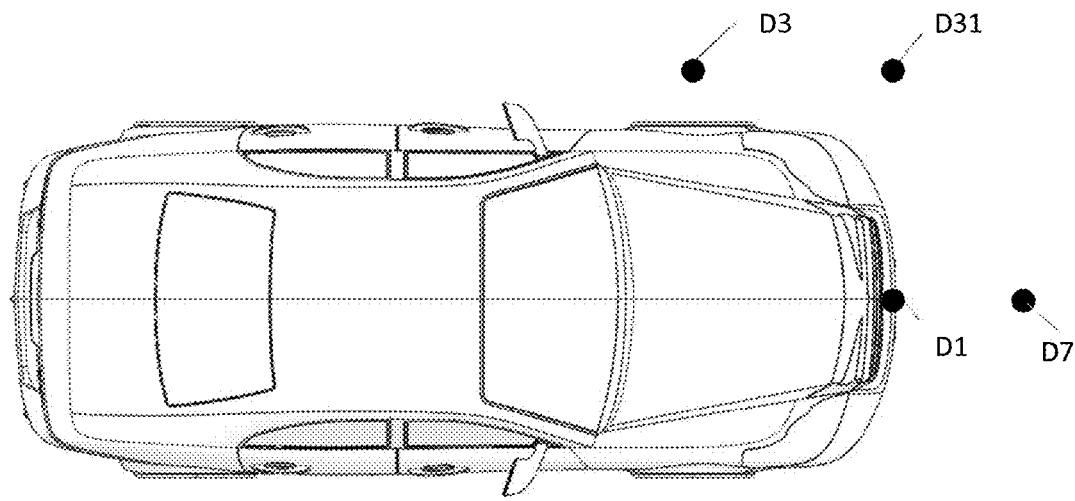

S4271, S4272 and S4274 are respectively the same as S4221, S4222, S4224 in Embodiment V, and therefore are not described in detail herein again. In S4273, the first reference point is set on only one side of the vehicle 200, as shown in FIG. 14b. After the second calibration laser emitter is already placed, a specific distance S is taken on the third calibration laser line and on one side of the first calibration point D1 to draw a first reference point D31 on the horizontal plane. The distance S may be greater than half a width of the vehicle 200, so that all of the calibration points are outside a body of the vehicle 200.

S423: Set, on the horizontal plane, a fifth calibration point at the preset calibration distance from the third calibration point, where a line connecting the third calibration point and the fifth calibration point is parallel to the central axial plane of the vehicle 200.

Figure 14E:
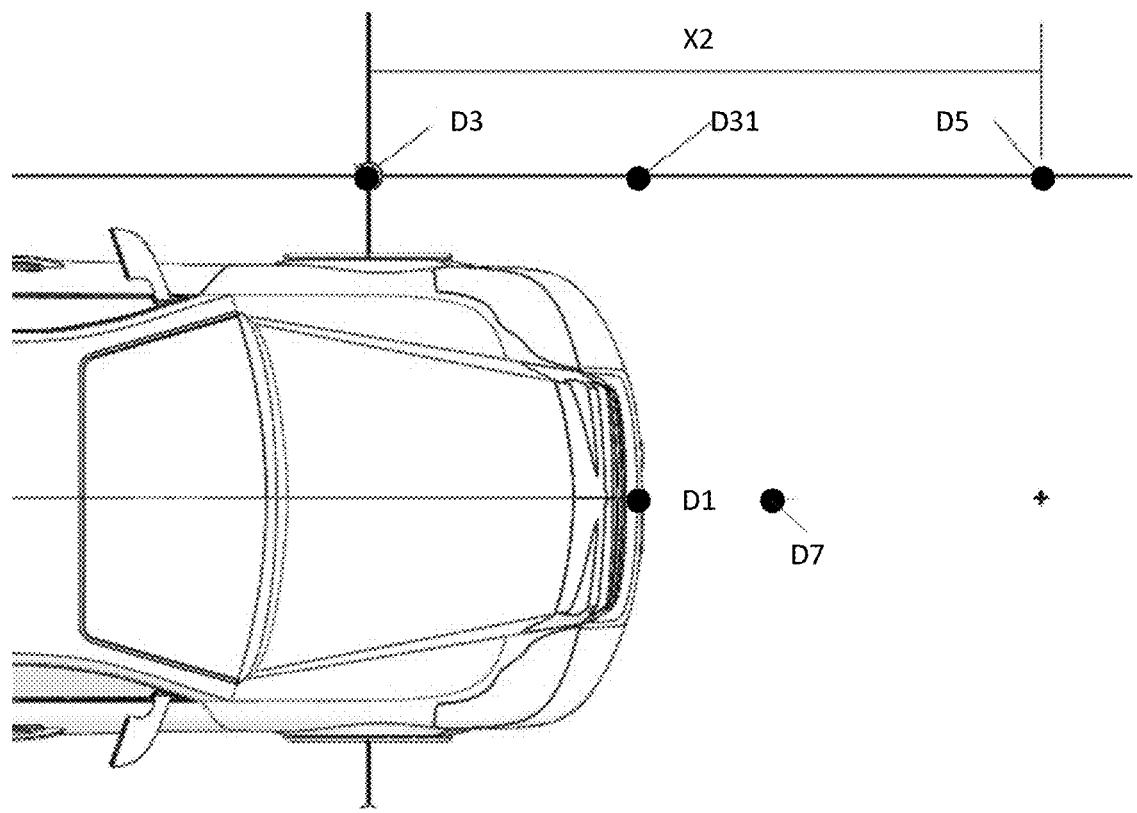

In this embodiment, As shown in FIG. 14e, after the third calibration point D3 is determined, a fifth calibration point may be set by using the second calibration laser emitter. A specific implementation may be: adjusting the second calibration laser emitter to the single-line mode, so that the second calibration laser emitter forms a second calibration laser line (or a third calibration laser line) on the horizontal plane, and moving the second calibration laser emitter, so that the second calibration laser line (or the third calibration laser line) extends through both the third calibration point D3 and the first reference point D31 to set the fifth calibration point D5 at a position at the preset calibration distance X2 from the third calibration point D3. In this way, a line connecting the third calibration point D3 and the fifth calibration point D5 is parallel to the central axial plane of the vehicle 200.

S429: Determine and set the calibration center point according to the first calibration point and the fifth calibration point.

S429 may specifically include the following steps:

S4291: Set a seventh calibration point on the second calibration laser line and on one side of the first calibration point away from the second calibration point when the calibration laser point of the second calibration laser emitter coincides with the first calibration point and the second calibration laser line extends through both the first calibration point and the second calibration point.

S4292: Move the second calibration laser emitter, so that the second calibration laser line extends through both the first calibration point and the seventh calibration point and the third calibration laser line extends through the fifth calibration point.

S4293: Set, on the horizontal plane, a point coinciding with the calibration laser point as the calibration center point.

S4291 may be performed after S4273. As shown in FIG. 14e, a seventh calibration point D7 is set on the second calibration laser line and on one side of the first calibration point D1 away from the second calibration point D2 when the calibration laser point of the second calibration laser emitter coincides with the first calibration point D1 and the second calibration laser line extends through both the first calibration point D1 and the second calibration point D2.

In this embodiment, the second calibration laser emitter is adjusted to the five-line mode. Therefore, the second calibration laser emitter forms a calibration laser point, a second calibration laser line and a third calibration laser line on the horizontal plane. The second calibration laser emitter is moved to such a position that the second calibration laser line extends through both the first calibration point D1 and the seventh calibration point D7 and the third calibration laser line extends through the fifth calibration point D5. In this case, a position of the calibration laser point formed by the second calibration laser emitter on the horizontal plane is the position of the calibration center point.

In this embodiment, when a preset calibration position is a front wheel, the position of the calibration center point is quickly and conveniently determined by using the second calibration laser emitter and the auxiliary target.

Finally, it should be noted that the foregoing embodiments are merely used for describing the technical solutions of the disclosure, but are not intended to limit the disclosure. Under the concept of the disclosure, the technical features in the foregoing embodiments or different embodiments may be combined, the steps may be implemented in any sequence, and there may be many other changes in different aspects of the disclosure as described above. For brevity, those are not provided in detail. The disclosure is described in detail with reference to the foregoing embodiments. However, those of ordinary skill in the art should understand that they may still make modifications to the technical solutions described in the foregoing embodiments or make equivalent replacements to some technical features thereof, without departing from the scope of the technical solutions of the embodiments of the disclosure.

What is claimed is:

1. A method for aligning a calibration device to a vehicle, the calibration device comprising a calibration bracket and a calibration laser emitter, the calibration bracket comprising a crossbar; and the method comprising:
   placing the vehicle on a horizontal plane;
   setting a calibration center point on the horizontal plane, so that the calibration center point is located on a line of intersection of a central axial plane of the vehicle and the horizontal plane, wherein:
   the calibration center point is at a preset calibration distance from a plane extending through a head of the vehicle and perpendicular to the horizontal plane:
      setting, on the horizontal plane, a first calibration point corresponding to a center of the head of the vehicle and a second calibration point corresponding to a center of a tail of the vehicle, and using a straight line where the first calibration point and the second calibration point are located as the line of intersection of the central axial plane of the vehicle and the horizontal plane;
      setting, on the horizontal plane and respectively on both sides of the central axial plane of the vehicle and according to the first calibration point and the second calibration point, a third calibration point and a fourth calibration point equidistant from the central axial plane of the vehicle, wherein a line connecting the third calibration point and the fourth calibration point is perpendicular to the central axial plane of the vehicle;
      setting, on the horizontal plane, a fifth calibration point at the preset calibration distance from the third calibration point, wherein a line connecting the third calibration point and the fifth calibration point is parallel to the central axial plane of the vehicle;
      setting, on the horizontal plane, a sixth calibration point at the preset calibration distance from the fourth calibration point, wherein a line connecting the fourth calibration point and the sixth calibration point is parallel to the central axial plane of the vehicle;
      determining a midpoint of a line connecting the fifth calibration point and the sixth calibration point; and
      using the midpoint of the line connecting the fifth calibration point and the sixth calibration point as the calibration center point;
   on the horizontal plane and respectively on both sides of the central axial plane of the vehicle and according to the first calibration point and the second calibration point, a third calibration point and a fourth calibration point equidistant from the central axial plane of the vehicle further comprises:
      placing two auxiliary targets respectively on the front wheels of the vehicle, each of the auxiliary targets comprising a vertical portion and a support portion, the vertical portion being perpendicularly connected to the support portion and abutting against the front wheel of the vehicle, a central axis of the vertical portion extending through a center point of the front wheel of the vehicle, and the support portion being placed on the horizontal plane;
      placing the calibration laser emitter on the horizontal plane;
      turning on the calibration laser emitter, so that the calibration laser emitter forms a calibration laser point, a second calibration laser line and a third calibration laser line on the horizontal plane, the second calibration laser line and the third calibration laser line being perpendicular to each other and intersecting at the calibration laser point;
      moving the calibration laser emitter, so that the calibration laser point coincides with the first calibration point and the second calibration laser line extends through both the first calibration point and the second calibration point;
      setting, on the third calibration laser line and respectively on both sides of the first calibration point, a first reference point and a second reference point equidistant from the first calibration point;
      moving the calibration laser emitter, so that the calibration laser point coincides with the first reference point and the third calibration laser line extends through the first calibration point, and setting the third calibration point at a point of intersection of the second calibration laser line and the support portion of one of the auxiliary targets; and
      moving the calibration laser emitter, so that the calibration laser point coincides with the second reference point and the third calibration laser line extends through the first calibration point, and setting the fourth calibration point at a point of intersection of the second calibration laser line and the support portion of the other of the auxiliary targets; or,
   the calibration center point is at the preset calibration distance from a plane extending through centers of two front wheels of the vehicle and perpendicular to the horizontal plane:
      setting, on the horizontal plane, a first calibration point corresponding to a center of the head of the vehicle and a second calibration point corresponding to a center of a tail of the vehicle, and using a straight line where the first calibration point and the second calibration point are located as the line of intersection of the central axial plane of the vehicle and the horizontal plane;

setting, on the horizontal plane and on a side of the central axial plane of the vehicle and according to the first calibration point and the second calibration point, a third calibration point equidistant from the central axial plane of the vehicle;

setting, on the horizontal plane, an auxiliary calibration point at the preset calibration distance from the third calibration point, wherein a line connecting the third calibration point and the auxiliary calibration point is parallel to the central axial plane of the vehicle; and determining and setting the calibration center point according to the first calibration point and the auxiliary calibration point;

turning on the calibration laser emitter, so that the calibration laser emitter emits two fan-shaped beams, the two fan-shaped beams forming, on the horizontal plane, a first laser line and a second laser line that intersect and are perpendicular to each other, and the crossbar being parallel to the fan-shaped beam where the second laser line is located; and adjusting a position of the crossbar, so that a point of intersection of the first laser line and the second laser line coincides with the calibration center point and the first laser line coincides with the line of intersection of the central axial plane of the vehicle and the horizontal plane.

2. The method according to claim 1, wherein the setting the calibration center point on the horizontal plane comprises:

setting, on the horizontal plane, a first calibration point corresponding to a center of the head of the vehicle and a second calibration point corresponding to a center of a tail of the vehicle, and using a straight line where the first calibration point and the second calibration point are located as the line of intersection of the central axial plane of the vehicle and the horizontal plane; and setting the calibration center point on the straight line where the first calibration point and the second calibration point are located and at a position at the preset calibration distance from the plane extending through the head of the vehicle and perpendicular to the horizontal plane.

3. The method according to claim 1, wherein the support portion has a through groove; and the setting, on the horizontal plane and respectively on both sides of the central axial plane of the vehicle and according to the first calibration point and the second calibration point, a third calibration point and a fourth calibration point equidistant from the central axial plane of the vehicle further comprises:

setting the third calibration point and the fourth calibration point in the through grooves.

4. The method according to claim 1, wherein the determining a midpoint of a line connecting the fifth calibration point and the sixth calibration point further comprises:

moving the calibration laser emitter, so that the second calibration laser line extends through both the first calibration point and the second calibration point and the third calibration laser line extends through both the fifth calibration point and the sixth calibration point; and setting, on the horizontal plane, a point coinciding with the calibration laser point as the midpoint of the line connecting the fifth calibration point and the sixth calibration point.

5. The method according to claim 1, wherein the setting, on the horizontal plane and on a side of the central axial plane of the vehicle and according to the first calibration point and the second calibration point, a third calibration point equidistant from the central axial plane of the vehicle, further comprises:

placing an auxiliary target on one of the front wheels of the vehicle, the auxiliary target comprising a vertical portion and a support portion, the vertical portion being perpendicularly connected to the support portion and abutting against the front wheel of the vehicle, a central axis of the vertical portion extending through a center point of the front wheel of the vehicle, and the support portion being placed on the horizontal plane;

placing the calibration laser emitter on the horizontal plane;

turning on the calibration laser emitter, so that the calibration laser emitter forms a calibration laser point, a second calibration laser line and a third calibration laser line on the horizontal plane, the second calibration laser line and the third calibration laser line being perpendicular to each other and intersecting at the calibration laser point;

moving the calibration laser emitter, so that the calibration laser point coincides with the first calibration point and the second calibration laser line extends through both the first calibration point and the second calibration point;

setting a first reference point on the third calibration laser line and on one side of the first calibration point; and moving the calibration laser emitter, so that the calibration laser point coincides with the first reference point and the third calibration laser line extends through the first calibration point, and setting the third calibration point at a point of intersection of the second calibration laser line and the support portion of the auxiliary target.

6. The method according to claim 1, wherein the determining and setting the calibration center point according to the first calibration point and the auxiliary calibration point further comprises:

setting a seventh calibration point on the second calibration laser line and on one side of the first calibration point away from the second calibration point when the calibration laser point of the calibration laser emitter coincides with the first calibration point and the second calibration laser line extends through both the first calibration point and the second calibration point;

moving the calibration laser emitter, so that the second calibration laser line extends through both the first calibration point and the seventh calibration point and the third calibration laser line extends through the auxiliary calibration point; and setting, on the horizontal plane, a point coinciding with the calibration laser point as the calibration center point.

7. The method according to claim 1, wherein the calibration bracket further comprises a vertical rod assembly and an angle adjustment mechanism, the vertical rod assembly being connected to the crossbar by using the angle adjustment mechanism, the crossbar being configured to mount the calibration laser emitter, and the angle adjustment mechanism being configured to rotate the crossbar relative to the vertical rod assembly; and the adjusting a position of the crossbar, so that a point of intersection of the first laser line and the second laser line coincides with the calibration center point and the first laser line coincides with the line of intersection of the central axial plane of the vehicle and the horizontal plane comprises:

adjusting the point of intersection of the first laser line and the second laser line to coincide with the calibration center point, and adjusting the angle adjustment mechanism, so that the first laser line coincides with the line of intersection of the central axial plane of the vehicle and the horizontal plane.

8. An auxiliary target, applicable to the method for aligning a calibration device to a vehicle according to claim 1, when the calibration center point is at the preset calibration distance from a plane extending through centers of two front wheels of the vehicle and perpendicular to the horizontal plane;

the auxiliary target comprising a vertical portion and a support portion, the vertical portion being perpendicularly connected to the support portion, and the support portion comprising a through groove; and when the auxiliary target is disposed on a front wheel of the vehicle, the vertical portion abutting against the front wheel of the vehicle, a central axis of the vertical portion extending through a center point of the front wheel of the vehicle, and the support portion being placed on a horizontal plane where the vehicle is placed.

9. An auxiliary target, applicable to the method for aligning a calibration device to a vehicle according to claim 1, when the calibration center point is at a preset calibration distance from a plane extending through a head of the vehicle and perpendicular to the horizontal plane the auxiliary target comprising a vertical portion and a support portion, the vertical portion being perpendicularly connected to the support portion, and the support portion comprising a through groove; and when the auxiliary target is disposed on a front wheel of the vehicle, the vertical portion abutting against the front wheel of the vehicle, a central axis of the vertical portion extending through a center point of the front wheel of the vehicle, and the support portion being placed on a horizontal plane where the vehicle is placed.

10. The auxiliary target according to claim 9, wherein the vertical portion has a marker on the central axis thereof, the marker being configured to be aligned to the center point of the wheel.

11. The auxiliary target according to claim 10, wherein the marker is one of:

a marking line or a marking point located on the central axis of the vertical portion;

an elongated marking structure disposed on the central axis of the vertical portion; and a through groove provided on the central axis of the vertical portion.

* * * * *